United States Patent
Gell et al.

(10) Patent No.: US 10,341,208 B2
(45) Date of Patent: Jul. 2, 2019

(54) FILE BLOCK PLACEMENT IN A DISTRIBUTED NETWORK

(71) Applicant: Taiwan Semiconductor Manufacturing Co., Ltd., Hsinchu (TW)

(72) Inventors: David Gell, San Diego, CA (US); Haibo Xu, San Diego, CA (US); Yiliang Bao, San Diego, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 198 days.

(21) Appl. No.: 14/812,859

(22) Filed: Jul. 29, 2015

(65) Prior Publication Data
US 2015/0333994 A1    Nov. 19, 2015

Related U.S. Application Data

(63) Continuation-in-part of application No. 14/038,123, filed on Sep. 26, 2013, now Pat. No. 9,633,041.
(Continued)

(51) Int. Cl.
*H04L 12/26* (2006.01)
*H04L 29/08* (2006.01)
(Continued)

(52) U.S. Cl.
CPC .......... *H04L 43/0882* (2013.01); *G06F 3/064* (2013.01); *G06F 3/0605* (2013.01);
(Continued)

(58) Field of Classification Search
CPC .......... G06F 17/30215; G06F 16/1844; G06F 3/067; G06F 3/064; G06F 3/0643;
(Continued)

(56) References Cited

U.S. PATENT DOCUMENTS 6,006,231 A     12/1999  Popa
6,195,332 B1 *  2/2001   Tang ................. H04Q 11/0478
                                                    370/232

(Continued)

FOREIGN PATENT DOCUMENTS

EP    1892921 A2    2/2008

OTHER PUBLICATIONS

Benson et al. "Network Traffic Characteristics of Data Centers in the Wild." IMC'10, Nov. 1-3, 2010, Melbourne, Australia, in 14 pages.
(Continued)

*Primary Examiner* — James E Richardson
(74) *Attorney, Agent, or Firm* — JCIPRNET

(57) ABSTRACT

A method for predicting available bandwidth for a candidate flow on a link in a distributed network includes obtaining information about a plurality of flows carried by the link, the information including a current bandwidth consumption for each of the flows carried by the link; identifying whether each of the flows carried by the link has a local constraint or a remote constraint; and computing the available bandwidth for the candidate flow based at least in part on the information about the flows carried by the link and the identification of whether each of the flows carried by the link has a local constraint or a remote constraint. The predicted available bandwidth can be used to predict bandwidth consumption for active flows. The predicted available bandwidths can be used in selecting file block placement options.

27 Claims, 11 Drawing Sheets

Related U.S. Application Data

(60) Provisional application No. 62/030,496, filed on Jul. 29, 2014.

(51) Int. Cl.
    *G06F 3/06*         (2006.01)
    *H04L 12/911*     (2013.01)
    *H04L 12/801*     (2013.01)
    *G06F 16/182*     (2019.01)

(52) U.S. Cl.
CPC ............ *G06F 3/067* (2013.01); *G06F 3/0643* (2013.01); *G06F 16/1844* (2019.01); *H04L 43/04* (2013.01); *H04L 47/822* (2013.01); *H04L 67/1097* (2013.01); *H04L 47/127* (2013.01)

(58) Field of Classification Search
CPC ... G06F 6/0605; H04L 43/04; H04L 43/0882; H04L 47/127; H04L 47/822; H04L 67/1097
USPC .......................................... 707/634; 709/201
See application file for complete search history.

(56) References Cited

U.S. PATENT DOCUMENTS

| | | | |
|---|---|---|---|
| 6,466,978 B1 | 10/2002 | Mukherjee | |
| 6,842,463 B1* | 1/2005 | Drwiega | H04L 41/0896 370/235 |
| 6,985,959 B1* | 1/2006 | Lee | H04L 45/00 709/203 |
| 7,047,287 B2 | 5/2006 | Sim | |
| 7,058,014 B2 | 6/2006 | Sim | |
| 7,076,553 B2 | 7/2006 | Chan | |
| 7,103,026 B2 | 9/2006 | Hall | |
| 7,165,095 B2 | 1/2007 | Sim | |
| 7,177,270 B2 | 2/2007 | Sim | |
| 7,181,523 B2 | 2/2007 | Sim | |
| 7,272,613 B2 | 9/2007 | Sim | |
| 7,542,471 B2 | 6/2009 | Samuels | |
| 7,616,638 B2 | 11/2009 | Samuels | |
| 7,630,305 B2 | 12/2009 | Samuels | |
| 7,656,799 B2 | 2/2010 | Samuels | |
| 7,698,453 B2 | 4/2010 | Samuels | |
| 8,233,392 B2 | 7/2012 | Samuels | |
| 8,233,490 B2 | 7/2012 | Hundscheidt | |
| 8,238,241 B2 | 8/2012 | Samuels | |
| 2002/0078174 A1* | 6/2002 | Sim | H04L 47/125 709/219 |
| 2005/0097283 A1 | 5/2005 | Karlsson et al. | |
| 2005/0213586 A1* | 9/2005 | Cyganski | H04L 41/0896 370/395.41 |
| 2007/0294410 A1* | 12/2007 | Pandya | H04L 29/06 709/226 |
| 2008/0154851 A1 | 6/2008 | Jean | |
| 2010/0332642 A1* | 12/2010 | Krishnaswamy | H04L 41/14 709/224 |

OTHER PUBLICATIONS

Calheiros et al. "CloudSim: a toolkit for modeling and simulation of cloud computing environments and evaluation of resource provisioning algorithms." Softw. Pract. Exper. 41:23-50 (2011). Published online Aug. 24, 2010 in Wiley Online Library (wileyonlinelibrary.com).

Garg et al. "NetworkCloudSim: Modelling Parallel Applications in Cloud Simulations." 2011 Fourth IEEE International Conference on Utility and Cloud Computing, pp. 105-113.

Jain et al. "B4: Experience with a Globally-Deployed Software Defined WAN." SIGCOMM'13, Aug. 12-16, 2013, Hong Kong, China, pp. 3-14.

International Search Report and Written Opinion for related PCT/US2014/056143, dated Dec. 4, 2014, in 18 pages.

\* cited by examiner

FILE BLOCK PLACEMENT IN A DISTRIBUTED NETWORK

CROSS-REFERENCE TO RELATED APPLICATIONS

This application claims the benefit of U.S. provisional application Ser. No. 62/030,496, filed Jul. 29, 2014, which is hereby incorporated by reference. This application is also a continuation-in-part of U.S. patent application Ser. No. 14/038,123, filed Sep. 26, 2013, which is hereby incorporated by reference.

BACKGROUND

The present invention generally relates to the field of distributed file systems and, in particular, to the placement of file blocks within a distributed file system.

As people have become increasingly connected to the Internet from home, at work or through mobile devices, more data is consumed through web browsing, video streaming, social networking, instant communication and e-commerce. At the same time, people generate more data by publishing photos, uploading videos, updating social network status, and purchasing goods and services on the Internet. This large amount of data is referred to as "web-scale" data or "big data." Known systems exist for the storage and processing of big data in a distributed manner across large numbers of computing and/or storage devices, which may be maintained in one or more clusters. An example of a distributed file system is the Google File System (GFS), which is a scalable distributed file system built with a large number of inexpensive commodity hardware devices for supporting large distributed data-intensive applications. GFS is used by Google's MapReduce programming model in which programs are automatically parallelized and executed on one or more large clusters built with commodity computers.

Another example of a distributed file system is the open source Apache Hadoop, which is a popular software framework that supports data-intensive distributed processing on large clusters of commodity hardware devices. Some companies currently use Apache Hadoop not only for their own distributed data storage and processing, but to offer distributed data storage and processing to customers via cloud-based services. Distributed file systems, such as Hadoop, save large data sets of big data by dividing a large data set into smaller blocks and storing the blocks in multiple nodes within a cluster that contains a large number of computers, each with its own data storage. To reduce the network bandwidth required for the processing of the large data set, the necessary data processing code is moved to the computer node that contains the data blocks. This strategy of moving computation to the data, instead of moving data to the computation, seeks to maximize data locality and reduce unnecessary network transfers for the processing of the stored data.

A typical distributed file system cluster may be comprised of many racks of computers, where each rack contains a number of computers, such as 50 computers. Each computer on a rack is connected to the "top of rack" (ToR) switch on the rack. The top of rack switch on each rack is also connected to one or more aggregation or core switches in the cluster. Together the ToR, aggregation and core switches provide interconnectivity among all computers in the cluster, and access to the external world via one or more gateways connected to the cluster.

In such a distributed file system, one of the computers acts as a file manager node and the other computers act as storage nodes. The file manager node acts as a master that decides where blocks of a large file should be replicated when a file is created or appended. The file manager node also decides where extra replicas of a block should be stored when a storage node storing a block fails or when the replication value of the file is increased. By dividing a large file into blocks and storing multiple copies of each block in different storage nodes, the distributed file system is able to store a very large file (e.g., from terabytes to petabytes) reliably in a large cluster of computers running as storage nodes. Storage nodes can be added as needed to increase the storage capability of a cluster, and failed storage nodes can be replaced and the replicas of the file blocks stored in the failed storage nodes can be accessed from the other storage nodes in which they are stored.

Typically, the distributed file system handles a file storage request from a client of the system by creating an entry in the file manager node metadata to identify the new file. The client then breaks the data of the new file into a sequence of blocks. Then, starting with the first block of the new file and block by block, the client asks the file manager node for permission to append a new block to the new file, and the client then receives from the file manager node the ID of the new block and a list of the storage nodes where the block should be replicated.

After the client receives the list of storage nodes where the new block should be replicated, the client prepares a block write pipeline, such as: the client will send the ID of the new block and the IDs of other storage nodes to the 1st storage node, and request it to prepare to receive the new block; the 1st storage node will request the 2nd storage node to prepare to receive the new block, and the 2nd storage node will request the 3rd storage node to prepare to receive the new block, and so on so forth until all storage nodes are ready to receive the new block. After the block write pipeline is prepared, the client initiates the block copies by copying the new block to the 1st storage node. Next, the 1st storage node copies the new block to the 2nd storage node, and so on, until the block is replicated the number of times specified by the replication factor of the file.

The placement of file block replicas is important to the reliability and performance of the distributed file system. While placing the replicas of a block in storage nodes located in different racks can improve reliability against rack failure, it may increase traffic loads in the top of rack switches and the core switches connecting the pipeline of storage nodes during block replication. Hadoop provides a rack-aware replica placement policy to improve data reliability, availability and some reduction of network bandwidth utilization. The default Hadoop rack-aware block placement policy tries to simultaneously meet two goals: (a) to place the replicas of a block in more than one rack to improve reliability against a single rack failure; and (b) to place multiple replicas in a single rack to reduce inter-rack traffic during block creation.

Unfortunately, such a block placement policy does not consider the real time status and conditions of the network and treats all the network connections between the storage nodes and the top of rack switches in the same manner. For example, a block replica may be designated for placement in a storage node even when the block replication pipeline would be congested at the network connection to/from that storage node. Furthermore, once a block placement decision has been made, no effort is made in the network to prepare for and support the upcoming transfers required by the block placement pipeline. The block replication transfer operations are left to contend and compete with all other traffic on the network. Accordingly, such a block placement policy may lead to inefficient use of the cluster network for block placement and may lead to increased congestion in the network connections to/from storage nodes and in the top of rack switches and the core switches of the cluster.

This may also lead to a problem for client users, such as clients of a cloud-based file distribution and data processing system, that have certain timing and service level requirements related to the client's Service Level Agreement (SLA) and/or contracted Quality of Service (QoS) requirements. This is because the default block placement policy does not consider any notion of service assurance via the client's Service Level Agreement (SLA) and/or and QoS requirements during the block placement decision process. Accordingly, the block placement decision may not satisfy the client's SLA and QoS requirements because of network congestion to/from the various storage nodes in the block placement pipeline and in the ToR and core switches.

SUMMARY

In one aspect, a method is provided predicting available bandwidth for a candidate flow on a link in a distributed network. The method includes: obtaining information about a plurality of flows carried by the link, the information about the plurality of flows carried by the link including a current bandwidth consumption for each flow of the plurality of flows carried by the link; identifying whether each flow of the plurality of flows has a local constraint or a remote constraint; and computing the available bandwidth for the candidate flow based at least in part on the information about the plurality of flows carried by the link and the identification of whether each flow of the plurality of flows has a local constraint or a remote constraint.

In one aspect, a computing device is provided for predicting available bandwidth for a candidate flow on a link in a distributed network. The computing device includes a memory configured to store data and processing instructions; and a processor configured to retrieve and execute the processing instructions stored in the memory to cause the processor to perform the steps of: obtaining information about a plurality of flows carried by the link, the information about the plurality of flows carried by the link including a current bandwidth consumption for each flow of the plurality of flows carried by the link; identifying whether each flow of the plurality of flows has a local constraint or a remote constraint; and computing the available bandwidth for the candidate flow based at least in part on the information about a plurality of flows carried by the link and the identification of whether each flow of the plurality of flows has a local constraint or a remote constraint.

In one aspect, a non-transitory computer-readable medium is provided for storing computer-executable instructions that, when executed by a processor, perform a method for predicting available bandwidth for a candidate flow on a link in a distributed network. The method includes: obtaining information about a plurality of flows carried by the link, the information about the plurality of flows carried by the link including a current bandwidth consumption for each flow of the plurality of flows carried by the link; identifying whether each flow of the plurality of flows has a local constraint or a remote constraint; and computing the available bandwidth for the candidate flow based at least in part on the information about the plurality of flows carried by the link and the identification of whether each flow of the plurality of flows has a local constraint or a remote constraint.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

File block placement in a distributed file system (DFS) is provided in which network conditions are taken into account when determining the placement of file blocks. In an aspect, the determined file block placement is facilitated by utilizing Software Defined Networking (SDN) enabled networking functions. In an aspect an enhanced DFS block placement algorithm obtains the real time cluster topology from the SDN controller of a software defined network, obtains the real time status of the network, evaluates the impact of potential block placement combinations on a specific client's SLA and QoS requirements, selects an optimal block placement based on the real time cluster topology and network status, and, optionally, allocates resources in the SDN network accordingly in support of the upcoming transfers associated with the block placement selection.

Figure 1:
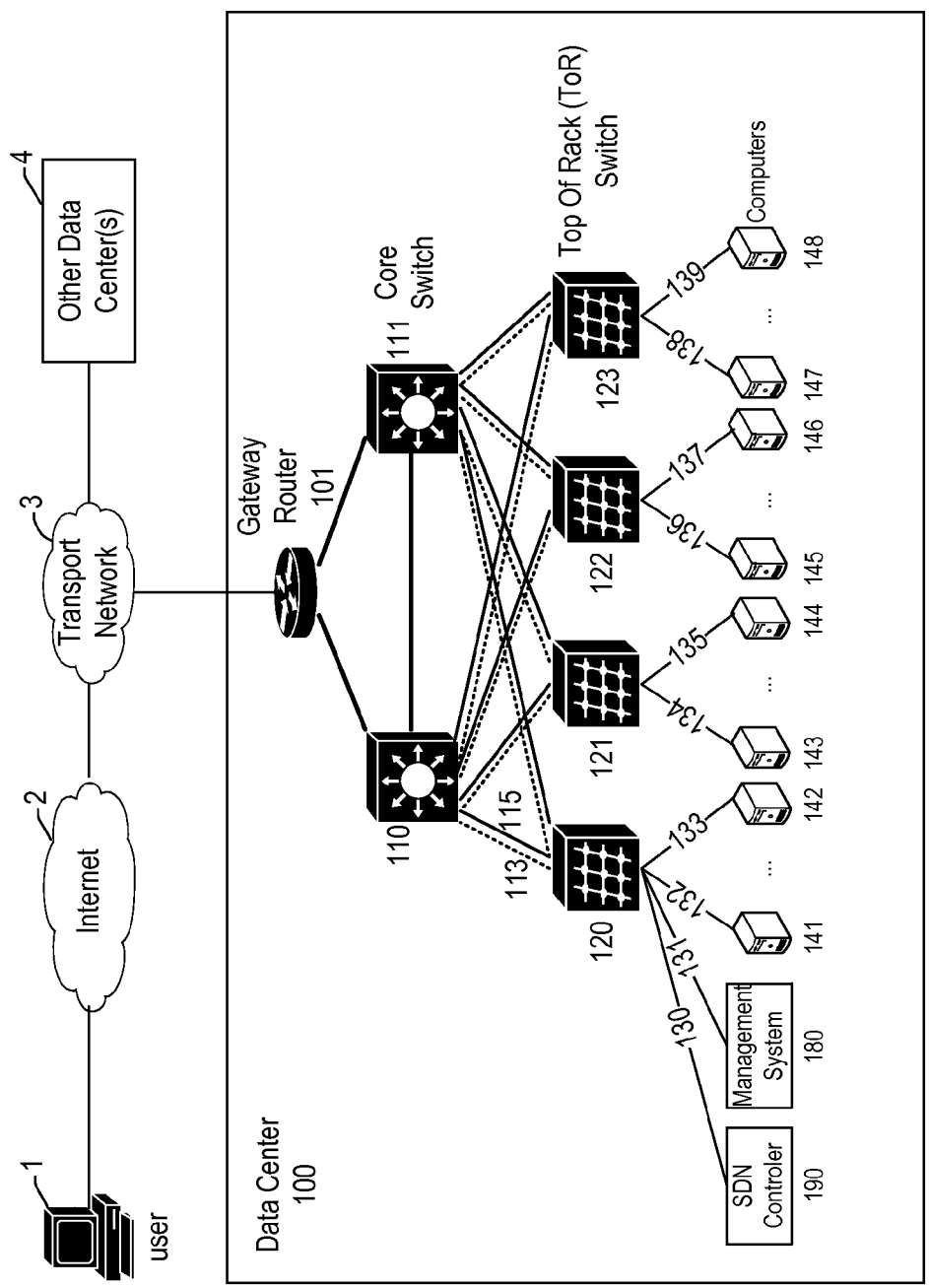
FIG. 1 is a block diagram of a distributed file system network in accordance with aspects of the invention.

FIG. 1 is a block diagram of a distributed file system (DFS) in which aspects disclosed herein may be implemented. As seen in FIG. 1, data center 100 is a cluster made up of many racks of computers (141-148, 180 & 190), each rack containing numerous computers. Each computer on a rack is connected to a top of rack switch (120-123) on the rack, and the top of rack switch on each rack is connected to one or more core switches (110, 111) of the data center 100. Data center 100 is connected to the Internet 2 through a transport network 3. A ToR (top of rack) switch is connected to multiple core switches with multiple connections to increase network reliability and performance of the cluster. The core switches 110 and 111 are interconnected with each other to exchange traffic between ToR switches (120-123). The core switches 110, 111 are connected to a gateway router 101 that provides network connectivity to the Internet 2 and other data centers 4. Each computer (141-148) may run processes to implement the distributed file system function and the data processing function of the cluster, such as a task monitor process and a storage node process for implementation of the DFS functionality of the cluster. In the example of Hadoop, these processes are known as the TaskTracker and the DataNode functions, respectively.

In an aspect, each task monitor and storage node pair runs on a dedicated computer. For example, a task monitor and a storage node may run on physical computer 141. Alternatively, multiple task monitor and storage node pairs may run simultaneously on a single physical computer. For example, a task monitor 1, a storage node 1, a task monitor 2 and a storage node 2 may all run on computer 141. Computer operating system virtualization, such as VMware virtual machines or similar systems, may be used to support multiple task monitor and storage node pairs running on a single physical computer. In an aspect, one or more of computers 141-148 may run a file manager node (referred to as NameNode in Hadoop) process to oversee file system management and determine block file placement among the storage nodes. Alternatively, the file manager node function may reside in a dedicated computer, such as computer 180, separate from computers running task monitor and/or storage node processes.

The computers in the data center can also run other tasks. For example, computer 190 may run software defined network (SDN) controller software to function as a SDN controller for the cluster network of data center 100, and computer 180 may run tasks to operate as a data center management system server, e.g., element management system (EMS), network management system (NMS), or operations, administration, and maintenance (OAM) system, to support fault management, configuration management, accounting management, performance management and security management, among other tasks. As described above, a two-tier switch network consisting of ToR switches 120-123 and core switches 110, 111 is used to connect the computers of the cluster. It should be appreciated that other types of network topologies can also be used for this purpose. For example, a three-tier switch network may be used that consists of ToR switches, End of Row (EoR) switches and core switches. In such a three-tier switches network, the ToR switches are connected to the EoR switches and the EoR switches are connected to the core switches. Of course, the cluster of data center 100 in FIG. 1 is exemplary and other configurations of computer, switches and network interconnections may be utilized in practicing aspects of the present invention. A data center may use, for example, a fat-tree or a mesh network architecture. Other data center 4 may have a similar network architecture, and may be in communication with data center 100. In an aspect, other data center 4 can participate in file block placement processes described herein.

Figure 2:
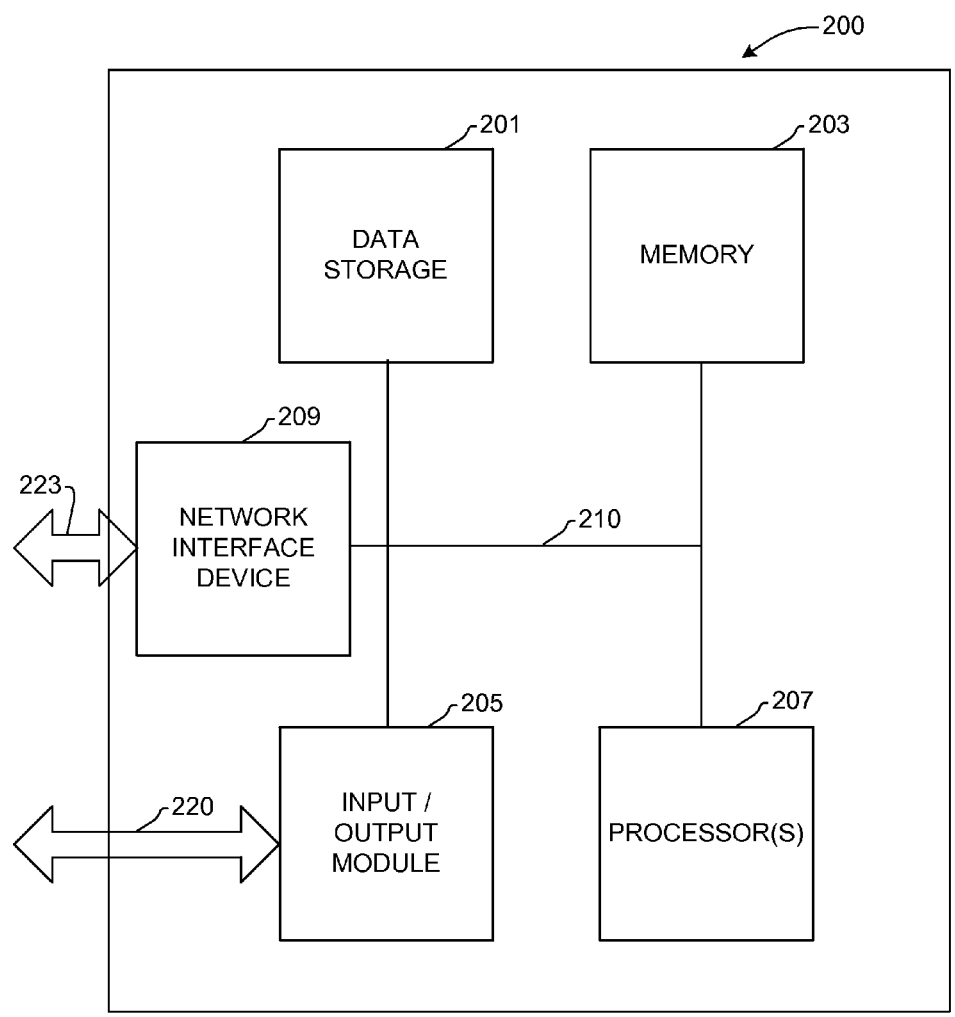
FIG. 2 is a block diagram of a network node in accordance with aspects of the invention.

FIG. 2 is a block diagram of a network node (or computer) in accordance with aspects of the invention. The computer 200 may be used, for example, to implement one of computers 141-148, 180 & 190 of data center 100 of FIG. 1. In FIG. 2, computer 200 includes a bus 210 or other communication device for communicating information, and a processor 207 coupled with bus 210 for processing information. Computer 200 also includes a memory 203, such as a random access memory ("RAM") or other dynamic storage device, coupled to bus 210 for storing information and instructions to be executed by processor 207. Memory 203 may also be used for storing temporary, variable or other intermediate information during execution of instructions by processor 207. Computer 200 further includes a data storage device 201, such as a magnetic disk drive, optical disk drive or solid state memory device, coupled to bus 210 for storing information and instructions.

Computer 200 may also include input/output (I/O) module 205 which optionally may be connected by connection(s) 220 to a display device (not illustrated), such as a cathode ray tube ("CRT"), liquid crystal display ("LCD"), light-emitting diode ("LED") display, organic light emitting diode (OLED) display, or other form of display for displaying information to a computer user. An input device, such as, for example, a keyboard, a mouse, a pointing device, a number of buttons, a microphone, and/or other inputs may also be optionally coupled to computer 200 via I/O module 205 for saving information to data storage device 201 and/or for communicating information and command selections to processor 207.

Network interface device 209 is also provided in computer 200 for one or more network connections to other computers, switches and devices in data center 100. Network interface device 209 may include one or more network interfaces that support wired and/or wireless connection(s) 223, and that may communicate via one or more protocols. For example, in an aspect, network interface device 209 may include one or more wired Ethernet network interfaces for connection(s) 223 that communicate via transmission control protocol (TCP)/internet protocol (IP). In an aspect, network interface device 209 may include one or more wireless network interfaces for connection(s) 223 that may communicate via WiFi, Bluetooth, LTE, WiMAX, CDMA, OFDM, or other wireless protocols. In an aspect, computer 200 may receive file blocks from other computers in data center 100 via network interface device 209, and may also send file blocks to other computers in data center 100 via network interface device 209.

According to an aspect, enhanced block placement functionality is performed by computer 200 by processor 207 executing one or more sequences of one or more instructions contained in memory 203. Such instructions may be read into memory 203 from another machine-readable medium, such as data storage device 201, or from an external machine-readable medium via I/O module 205. In an aspect, processor 207 may represent multiple processors arranged in a multi-processing arrangement to execute the sequences of instructions contained in memory 203, or received from another source via bus 210. In an alternative aspect, hard-wired circuitry may be used in place of or in combination with software instructions to implement the invention. Thus, embodiments of the invention are not limited to any specific combination of processors, hardware circuitry and software.

The term "machine-readable medium" as used herein refers to any medium or device that participates in providing instructions to processor 207 for execution. Such a medium may take many forms, including, but not limited to, non-volatile media, volatile media, and transmission media, such as a wired or wireless link. Non-volatile media include, for example, optical or magnetic disks, such as data storage device 201. Volatile media include dynamic memory, such as memory 203. Transmission media include coaxial cables, copper wire, and fiber optics, including the wires that comprise bus 210. Transmission media can also take the form of electromagnetic waves, acoustic waves, or light waves, such as those generated during radio frequency and infrared data communications. Common forms of machine-readable media include, for example, floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory device, chip or cartridge, a carrier wave, or any other medium from which a computer can read instructions or data. It should be appreciated that computer 200 may include other known components, devices and may be configured in other arrangements, while still supporting the implementation of the present invention.

Figure 3:
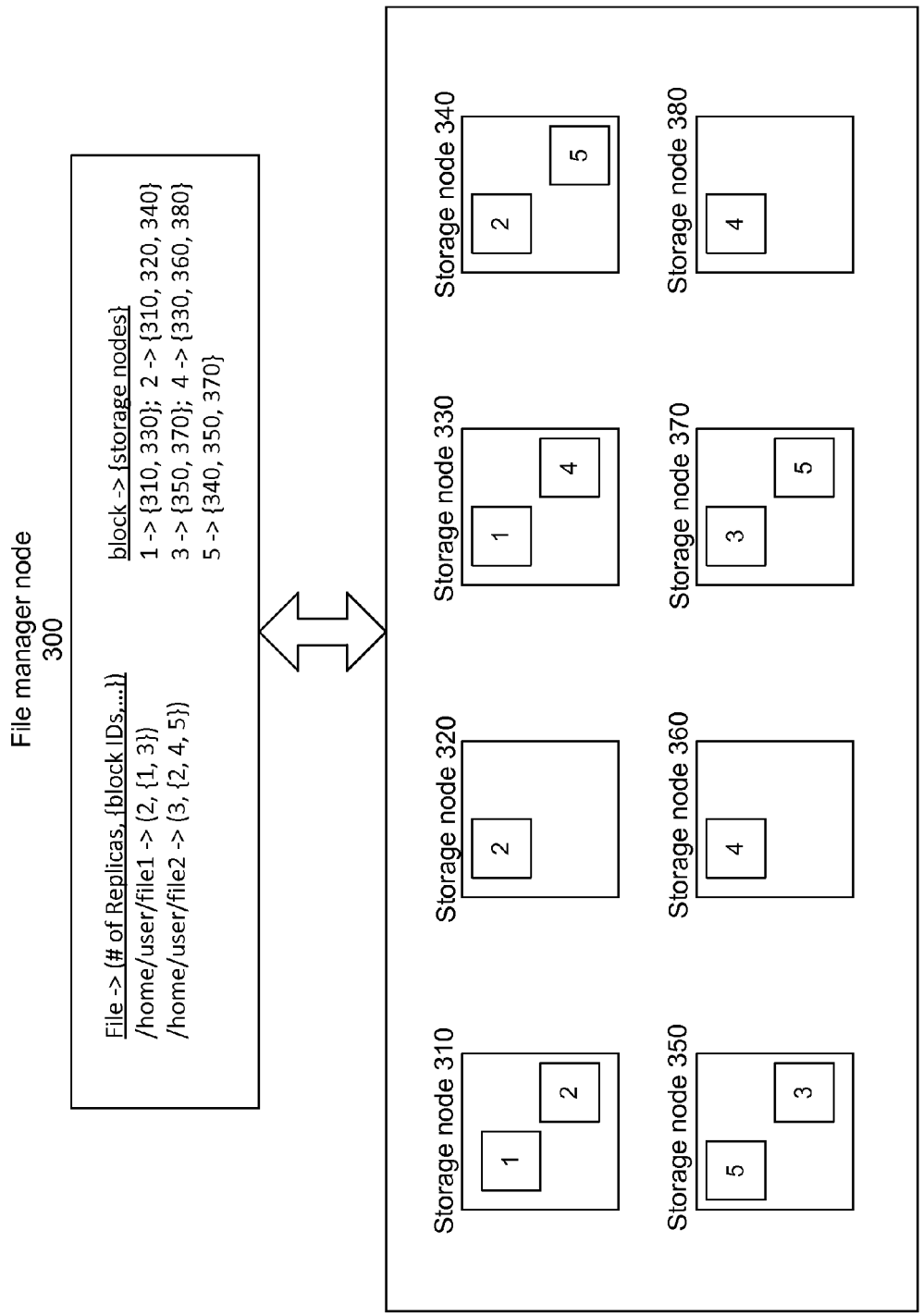
FIG. 3 is a block diagram of an exemplary block file placement in a distributed file system network in accordance with aspects of the invention.

FIG. 3 is a block diagram of an exemplary block file placement in a distributed file system network in accordance with aspects of the invention. The block diagram of Figure can provide a functional depiction of the cluster of data center 100 of FIG. 1, in which one of computers 141-148 is acting as a file manager node, and other computers are acting as storage nodes. In this regard, the cluster is depicted in FIG. 3 as including functional nodes including file manager node 300, and storage nodes 310-380 which are interconnected by network connections as described above. The example shown in FIG. 3 is a functional example of how files are broken into blocks and how each block is replicated across multiple storage nodes. As mentioned above, a DFS stores large data files in smaller fixed size blocks across a cluster. In an aspect, the size of each file block is the same, such as 64 MB for example, except for the last file block which may be smaller depending on the last remaining data. In another aspect, the file blocks may be of different sizes. In an aspect, each file block is replicated to multiple storage nodes to provide redundancy against node or rack failure in the cluster.

In an aspect, file manager node 300 and storage nodes 310-380 operate in a master-slave architecture. In an aspect, the file manager node and storage node functionalities are implemented in software designed to run on computers. The file manager node operates as a master that manages the file system namespace and maintains the file system directory tree and the metadata for all the files and directories in the tree. The file manager node manages all the operations such as creating, opening, closing and renaming files and directories. The file manager node also determines the mapping of files to their component blocks and the mapping of each of the blocks to the storage nodes where they are physically stored. The storage nodes store the file blocks and provide block reading/writing access to all users of the DFS service such as data processing administration (TaskTracker in Hadoop), and DFS import/export utilities. Storage nodes periodically report the list of blocks they are storing back to the file manager node in the form of periodic heartbeat and block report messages.

In the example of file block distribution shown in FIG. 3, two files, "/home/user/file1" and "/home/user/file2" are stored in the DFS cluster. File manager node 300 stores the mapping of the block IDs associated with each file along with the number of block replicas designated for the blocks of each file. In addition, file manager node 300 stores the mapping of each block to the storage nodes in which it is stored, based on the designated number of replicas for the file of which that block is a component. As seen in FIG. 3, the file "/home/user/file1" is broken into block IDs 1 and 3 and each block for this file is replicated 2 times. Similarly, the file "/home/user/file2" consists of block IDs 2, 4 and 5, and each block for this file is replicated 3 times. As shown in the diagram, the blocks making up the two files are replicated and stored in storage nodes 310-380 in the cluster according to the "block→{storage nodes}" mapping shown in file manager node 300. As seen in the example shown in FIG. 3, block ID 1 of "/home/user/file1" is replicated in storage nodes 310 and 330, and block ID 3 of "/home/user/file1" is replicated in storage nodes 350 and 370. Similarly, block ID 2 of "/home/user/file2" is replicated in storage nodes 310, 320 and 340, block ID 4 of "/home/user/file2" is replicated in storage nodes 330, 360 and 380, and block ID 5 of "/home/user/file2" is replicated in storage nodes 340, 350 and 370, The DFS, such as that shown in FIG. 3, is designed to support local data processing at the site of the stored blocks, such as the MapReduce type of data processing in Hadoop. In an aspect, the file blocks stored in a DFS can be read in parallel by multiple processing tasks at the same time. The file manager node of the DFS provides a process monitor, such as the MapReduce JobTracker of Hadoop, with the location of each file block. The process monitor can use the file block locations to schedule the processing tasks to be performed on the nodes where a replica of a block is available. If a task processing a file block fails, the process monitor can reschedule the task to run in a different node containing a replica of the file block.

In this regard, the nodes in the cluster may communicate with each other over a TCP/IP connection(s). The process tracker function, the file manager node function and the storage node function expose their functionalities through interfaces such as the Remote Procedure Call (RPC) call. Each of these functions listens on a pre-configured TCP port and responds to the function call received on the TCP socket. For example, in Hadoop, Java application programming interfaces (APIs) are provided to encapsulate the RPC interfaces exposed by Hadoop MapReduce and Hadoop distributed file system (HDFS). With the Hadoop Java API, a data processing task can be programmed in the Hadoop MapReduce framework and such tasks can be easily scheduled to run in multiple nodes in the cluster. Such an API also enables programs to create and access files stored in the cluster without worrying about the internal details of the DFS. A client then uses the API to access the features and capabilities provided by the cluster. Many common utilities for file access and cluster maintenance are also provided.

Figure 4:
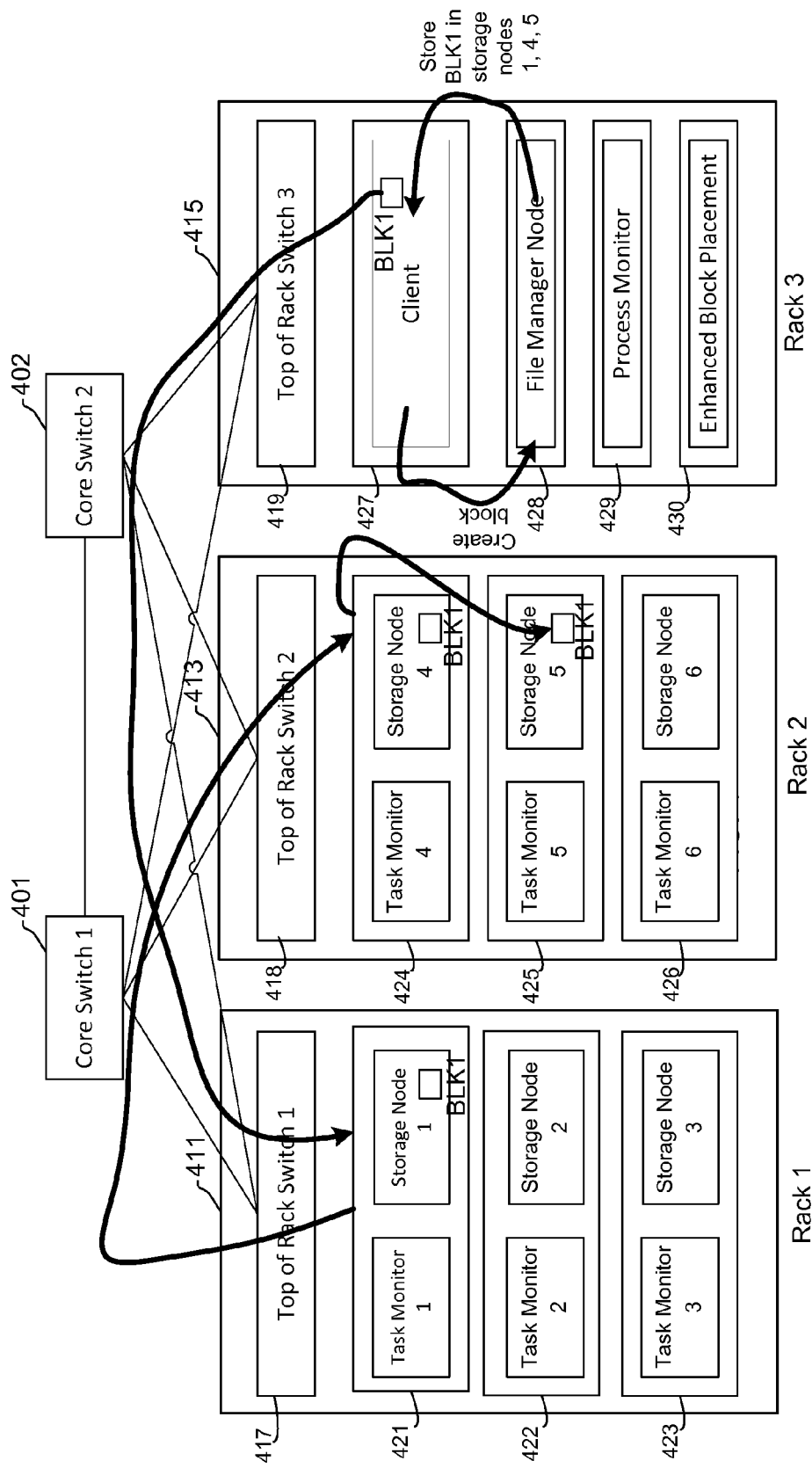
FIG. 4 is a block diagram showing network paths related to an exemplary block file placement in a distributed file system network in accordance with aspects of the invention.

FIG. 4 is a block diagram showing network paths related to an exemplary block file placement in a distributed file system network in accordance with aspects of the invention. FIG. 4 functionally depicts the file block replication process across multiple storage nodes in a distribution file system cluster. As seen in FIG. 4, three racks 411, 413 & 415 are shown, in which racks 411 and 413 contain three computers and a ToR switch. For example, rack 411 includes computers 421, 422 and 423, and ToR switch 417 which is connected to computers 421, 422 and 423. Each of the computers contained in racks 411 and 413 runs a task monitor process enabling it to support data processing of stored data and also runs a storage node process enabling it to function as a storage node for storage of file blocks. In this regard, the term "process" as used herein is used in the generic sense of a software procedure and the actual implementation may be in the form of an operating system process, a thread, a process implemented via a script, a daemon or other form of executable. The racks and switches of FIG. 4 may be implemented in the data center 100 of FIG. 1.

Rack 415 includes four computers 427, 428, 429 and 430 and a ToR switch 419. In the example of FIG. 4, computer 427 runs a client process enabling it to perform client tasks for a specific user of the distributed file system. In another aspect, the client process may be implemented in a computer external to data center 100, but in communication with data center 100. For example, the client process may be a client task that uses the distributed file system to store large data files in the distributed file system or to initiate data processing of data stored in the distributed file system. The client task may be performed on behalf of a user that is the operator of the distributed file system, or may be performed on behalf of a user that is external to the distributed file system and is utilizing the distributed file system via a cloud-based service. Computer 428 runs a file manager node process enabling it to function as the file manager node in the distributed file system cluster shown in FIG. 4, so as to control and track the mapping of files to their component blocks and the designation and mapping of blocks to storage nodes within the cluster. Computer 429 runs a process monitor process enabling it to function as the process monitor in the distributed file system cluster shown in FIG. 4, so as to control and monitor data processing tasks that may be distributed among the various task monitors operating in the computers of the cluster. Lastly, computer 430 runs an Enhanced Block Placement process enabling it to conduct enhanced placement of file blocks among the storage nodes in the cluster by also taking into account network conditions in the network paths to/from the various storage nodes and switches in the cluster.

The three ToR switches 417, 418 and 419 are each connected to both of core switches 401 and 402 for control and routing of data traffic among racks 411, 413 and 415, and for network connection of the cluster to an external network, such as the Internet or other data center(s). It should be appreciated that the configuration of functions and computers shown in FIG. 4 is exemplary and that other arrangements of the various functions within one or more computers are also possible for implementation of aspects of the invention.

FIG. 4 also depicts an example of file block replication and distribution among multiple storage nodes of the cluster. As described above, a file is stored in the distributed file system (DFS) as a sequence of blocks, all of which are the same size except, in some cases, the last block, and each file block is replicated in at least one storage node. In an aspect, the block size and replication factor may be configurable for each file. As the master node of the DFS, the file manager node decides where each file block should be replicated when the block is created. The file manager node also decides and designates where extra replicas of a block should be stored when a storage node storing the block fails or when the replication value of the file is increased.

When a client creates a new file in the DFS, it first requests the file manager node to create an entry in the file manager node metadata to identify the new file. The client then breaks the data of the new file into a sequence of blocks. Starting with the first block of the new file, and then block by block, the client asks the file manager node for permission to append a new block to the new file in DFS, and then the client receives from the file manager node the block ID of the new block and a list of storage nodes where the block is to be replicated. In the example of block creation shown in FIG. 4, computer 427 (as a client) first sends a request for the creation of new block to the file manager node 428. File manager node 428 then creates a new block ID of BLK1 in its metadata associated with the file, and determines that the new block should be replicated to storage node 1, storage node4 and storage node5, and returns this information back to client 427.

Client 427 then prepares a block write pipeline as follows: (1) the client is to send the new block ID and the IDs of other storage nodes (storage node4 and storage node5) to the storage node1, and requests storage node1 to prepare to receive the new block; (2) storage node1 is to request storage node4 to prepare to receive the new block, and the storage node4 is to request the storage node5 to prepare to receive the new block, and so on so forth until all designated storage nodes are ready to receive the new block. With the block write pipeline prepared, the client begins copies copying the new block to the storage node1 located in computer 421 of rack 411. As storage node 1 receives the new block, it begins copying the received portions of the block to storage node4 in computer 424 of rack 413, and so on, until the block is replicated the number of times specified by the designated replication factor for the file. Replicating file blocks in a pipeline fashion accelerates file creation and reduces the amount of processing the client needs to perform to store all replicas of the blocks of file. In the example shown in FIG. 4, the client copies the block to storage node1, storage node1 copies the block to storage node4, and storage node4 copies the block to the storage node5.

During file block replication and transfer to the designated storage nodes, each file block is divided into smaller portions referred to as packets. Each packet is typically the same size, such as 64 Kbytes for example. Once a storage node finishes receiving a file packet of a block from the previous storage node in the pipeline, it starts transmitting the file packet to the next storage node in the pipeline without waiting for all other file packets of the file block to be received.

Figure 5:
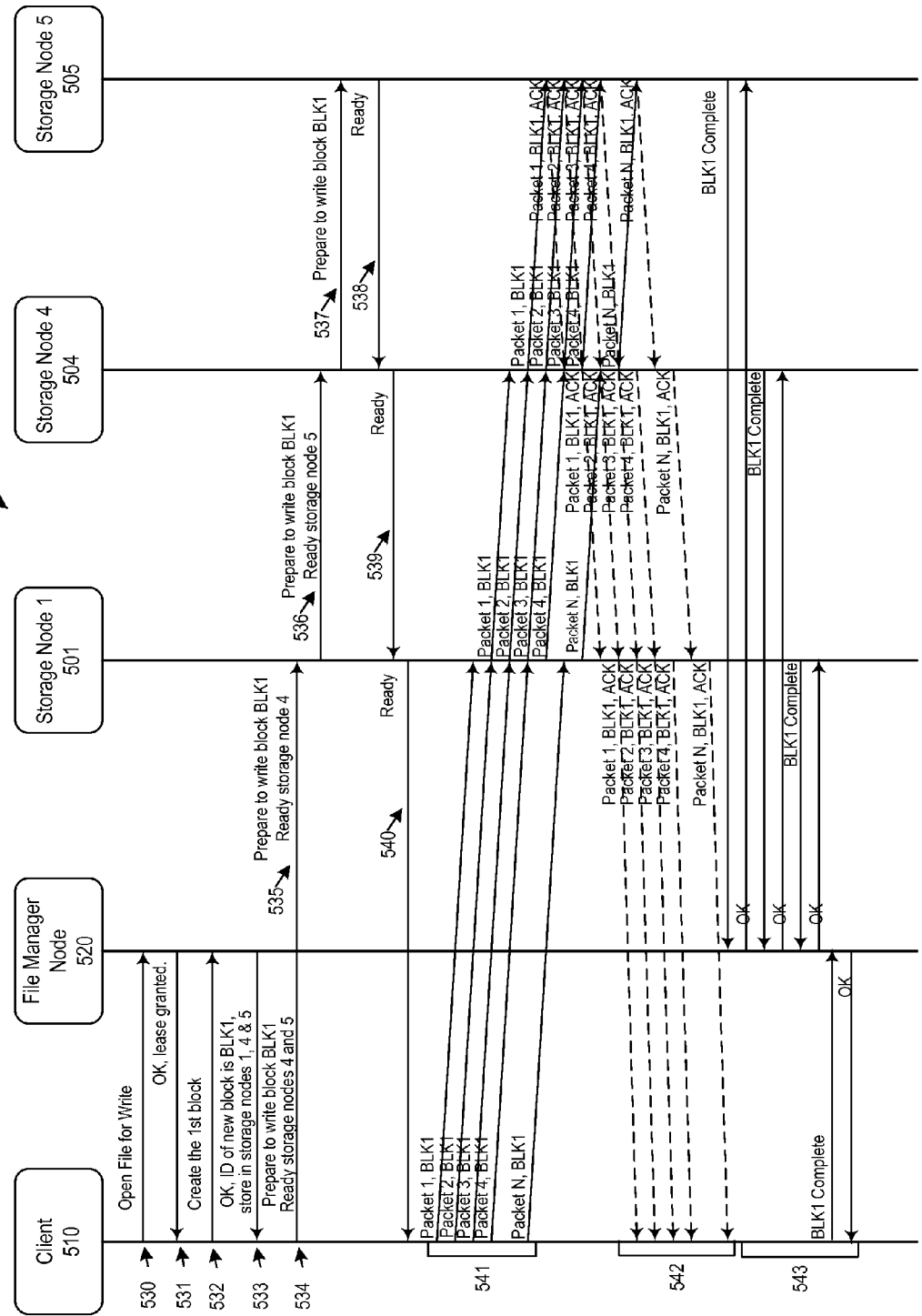
FIG. 5 is a sequence diagram showing block file creation and storage sequencing associated with an exemplary block file placement in a distributed file system network in accordance with aspects of the invention.

FIG. 5 is a sequence diagram showing block file creation and storage sequencing associated with an exemplary block file placement in a distributed file system network in accordance with aspects of the invention. FIG. 5 shows how the Client, the file manager node and the storage nodes of FIG. 4 interact to create the first block of a file and how that block is replicated across three of the storage nodes (1, 4 and 5). As shown in the FIG. 5, the process begins at step 530 in which Client 510 (corresponding to computer 427 in FIG. 4) sends a request to file manager node 520 (corresponding to computer 428 in FIG. 4) to open a new file for writing to the distributed file system (DFS) so that Client 510 can store a particular data file in the DFS. Next, file manager node 520 responds in step 531 with an OK to indicate that a lease was granted for Client 510 to write the new file in the DFS. In step 532, Client 510 partitions the file and creates the first block and sends the indication of the first block to file manager node 520 to obtain a block ID for the first block and a designation of the multiple storage nodes (referred to as the "pipeline" of storage nodes) in which replicates of the block are to be stored. In the example shown in FIG. 5, the new block is assigned a block ID of BLK1 by file manager node 520 and is designated by file manager node 520 to be replicated into storage node1 501, storage node4 504 and storage node5 505, and file manager node 520 replies to Client 510 with this information in step 533. Now that Client 510 has the storage node pipeline information from file manager node 520 for the first block BLK1, Client 510 proceeds in step 534 to send instructions to storage node1 501 to prepare to write block BLK1 and to ready storage node4 and storage node5 for writing of block BLK1.

As mentioned above, as each block of a file is sent to a storage node for storage, it is actually partitioned into smaller uniform-size packets for efficient transfer. In step 541, Client 510 sequentially initiates transfer of multiple packets (1, 2, . . . , N) that make up block BLK1 to storage node1 501. As depicted in FIG. 5, once storage node1 and each subsequent storage node in the designated pipeline for the block receives a packet, they then begin transmission of the packet to the next storage node in the pipeline, without waiting for receipt of the next packet of that block. Similarly, in step 542, as each storage node receives a packet it then sends a packet acknowledgment back to the previous storage node in the pipeline that sent the packet, and the previous storage node sends the acknowledgment back to its previous storage node until the packet acknowledgment is finally received at Client 510. As seen in step 543, as the last packet of the block is received at a storage node, the storage node sends a block complete acknowledgment for that block (BLK1) back to file manager node 520, and when Client 510 receives the packet complete acknowledgments for all of the packets in the block, Client 510 sends a block complete acknowledgment for that block back to file manager node 520 It should be appreciated that the sequence scheme depicted in FIG. 5 is exemplary, and that other sequence arrangements for writing a block to multiple storage nodes in the DFS may be used to implement aspects of the invention.

In an aspect, an enhanced block placement process is used to designate a storage node pipeline for writing of a block that takes into account the state of the network connections in the cluster between the storage nodes and the expected timing requirements of the client, among other factors. Through the use of, for example, software defined network (SDN) functionality, the enhanced block placement algorithm can obtain the real time cluster topology from the SDN controller of the software defined network. The enhanced block placement algorithm can also obtain the real time status of the cluster network, evaluate the impact of potential block pipeline combinations on a client's SLA and QoS requirements, select an optimal block pipeline based on the real time cluster network topology and network status, and, optionally, allocate resources in the SDN accordingly to efficiently support the upcoming transfer of block data via the designated pipeline.

Figure 6:
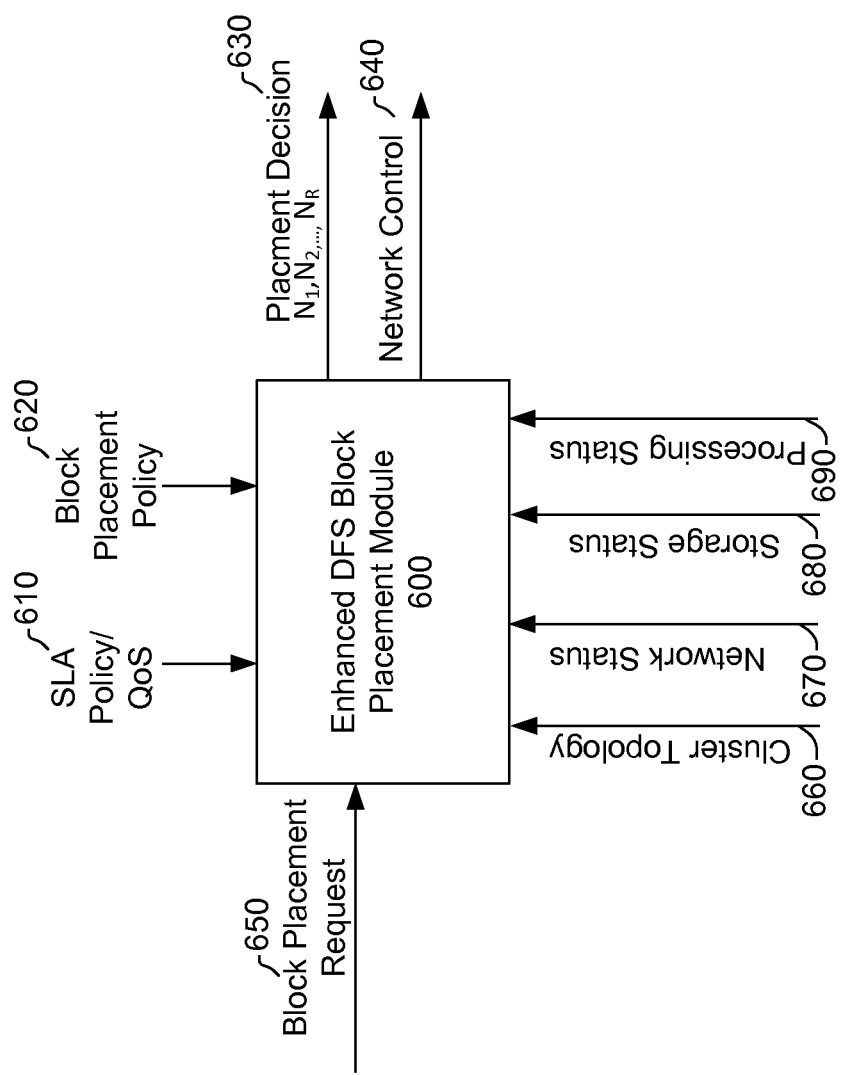
FIG. 6 is a block diagram of an enhanced block placement module in accordance with aspects of the invention.

FIG. 6 is a block diagram of an enhanced block placement module in accordance with aspects of the invention. The enhanced block placement module can provide designation of a storage node pipeline for use in, for example, the distributed file system network of FIG. 1. As seen in FIG. 6, enhanced DFS block placement module 600 has inputs that include the block placement request 650, the real time cluster topology 660, network status 670, storage status 680, processing status 690, block placement policy 620, client SLA policy and QoS requirements 610 and provides an optimum block placement decision 630 (storage node pipeline) for the client to write replicates of a file block in the DFS. In an aspect, enhanced DFS block placement module 600 may also output network control instructions to the SDN controller of the DFS to reconfigure the network in order to efficiently support the transfer of the block data via the storage node pipeline and thereby improve network performance and drive toward meeting the client's SLA and QoS requirements.

The enhanced DFS block placement process of module 600 shown in FIG. 6 can be implemented as part of the file manager node process, the process monitor process or a separate standalone process. Similarly, the enhanced DFS block placement process can be executed on the same computer that runs other processes such as file manager node or process monitor, or can be executed on a separate dedicated computer, as depicted by computer 430 in FIG. 4. The various inputs for enhanced DFS block placement module 600 of FIG. 6 are described below.

Block Placement Request 650: In an aspect, when a DFS client sends a request to the file manager node of the cluster to create a DFS file block, block placement request 650 is also sent to enhanced DFS block placement module 600 from the file manager node. Block placement request 650 includes information related to the request, including at least one or more of the following:
  Information of the client for which the DFS file block is created;
  The computer from which the request is initiated; and
  Information of the file for which the DFS file block is created (file block size, replication factor, etc.).

Cluster Topology 660: In an aspect, enhanced DFS block placement module 600 may obtain cluster topology 660 from a SDN controller (or management system or another source) and the file manager node of the cluster. The topology may be a map of the cluster and may contain information describing the computers and switches of the cluster and their interconnection via a network. In an aspect, at least one or more of the following information may be gathered for each computer in the cluster:
  Computer ID;
  Hardware configuration (number of processors/cores, type and size of memory, type and size of storage, number of network ports);
  Software configuration (OS version, Java version, DFS version, etc.); and
  Power consumption information (joules per million instructions per second (MIPS), watts per million floating point operations per second (MFLOPS), etc.)

Each computer in the cluster is connected to the network with one or more network ports. For each network port on each computer, at least one or more of the following information may be obtained:
  Port ID;
  MAC address;
  IP address;
  Port capabilities (speed, duplex, etc.);
  Port status (activated, deactivated, etc.); and
  Connection information (ID of the peer network device and the ID of corresponding port on the peer network device).

For each network node (e.g., switch or router), at least one or more of the following information may be obtained:
  Network node ID;
  Network node type (ToR switch, core switch, etc.);
  Capabilities (number of ports, OpenFlow support, etc.); and
  Power consumption information (average/maximum/idle power consumption, etc.).

For each port of all the network nodes, at least one or more of the following information may be obtained:
  Port ID;
  Port capabilities (speed, duplex, etc.);
  Port status (activated, deactivated, etc.); and
  Connection information (ID of the peer computer or network node and the ID of corresponding port on the peer computer or network node).

Based upon the above information, a map of the nodes and connections may be established. The resulting cluster topology can be maintained in various forms such as tables, databases, etc. Various methods to discover the topology of the cluster and network can be used. The file manager node can get the computer hardware/software configuration information and power consumption information from the storage node process that runs on each computer. In an aspect, the SDN controller may discover the addresses of the computers in the cluster by observing the traffic generated by the computers. For example, a SDN controller can program all of the ToR switches so that all address resolution protocol (ARP) and dynamic host configuration protocol (DHCP) packets generated by the computers are copied by the ToR switches to the SDN controller. With all the ARP and DHCP messages received, the SDN controller can discover the MAC address and IP address of all the computers as well as the ToR switches and the switches' ports to which the computers are connected. The SDN controller can program all of the ToR switches and core switches to use Link Layer Discover Protocol to discover how the ToR switches and core switches are interconnected. Some or all of this information can be used to generate cluster topology 660 which is input to enhanced DFS block placement module 600.

Network Status 670: The network status is information describing the current state of the cluster network. The network status may include at least one or more of the following information for each network port in each network node:

Throughput, latency and jitter;
% capacity utilization;
Queue length and quantity of discarded frames; and
The active traffic flows and their configuration and status.

A traffic flow in a network node identifies a sequence of packets from a source port to a destination port. A traffic flow in a network node usually identifies all the packets generated by a user application such as a DFS file import utility operating on the network node. A user application usually generates many traffic flows in multiple networks nodes. For example, when a file is imported to the DFS, the DFS file import utility creates many DFS file blocks in the cluster. A file block replication pipeline is recreated to replicate each block. Two traffic flows are created on all the network nodes connecting the storage nodes in the pipeline, one for each direction of the traffic on the pipeline. For each active traffic flow in each network node, at least one or more of the following configuration and status information may be obtained:

Traffic flow ID;
Ingress port ID;
Egress port ID;
Customer ID (e.g., the ID of the customer for whom the traffic flow is created);
Customer Job ID (e.g., the ID of the customer's MapReduce Job);
Customer Task ID (e.g., the ID of the customer's MapReduce Tasks);
Capacity reservation (e.g., how much bandwidth is reserved for the traffic flow);
Utilization of the network connection (e.g., the percent of bandwidth of the network connection used by the flow);
Queue length (e.g., how many packets are queued for processing); and
Average latency.

In an aspect, the above configuration and status information may be collected from an SDN controller, such as SDN controller 190 of FIG. 1, which may track this information using the OpenFlow protocol. The SDN controller can query the network nodes for network status information as needed, and can also instruct the network nodes to report their status information to the SDN controller proactively. For example, a network node can be programmed to report its status periodically. Alternatively, a network node can be programmed to report its current status when its status has changed by a certain threshold amount compared with its last report status.

Storage Status 680: The storage status includes information about the current storage state of all of the computers in the cluster. At least one or more of the following information is obtained for each computer:

Total size of the storage devices (e.g., HDD); and
The amount of storage used.

In an aspect, the DFS file manager node obtains storage space utilization information based on the storage node configuration information and the storage node status information provided in the heartbeat (periodic) messages and block report messages sent by each of the storage nodes in the cluster.

Processing Status 690: The processing status is the information about the jobs currently performed by all the computers in the cluster. At least one or more of the following information is maintained and provided in the Processing Status for each job performed in the cluster:

Job ID;
Job type (e.g., blocks replication, map task, reduce task, etc.);
Customer ID (e.g., the ID of the customer for whom the job and task is performed);
The IDs of the network nodes used to support the job;
The IDs of the computers used to process the job;
The network connections used to support the job; and
The QoS/SLA targets and guarantees provided to the job (e.g., reserved network capacity, delay budget, network processing priority, block replication time per GB, etc.).

On each computer, at least one or more of the following information is maintained and provided in the Processing Status:

The number of CPUs or processor cores installed;
Overall CPU utilization (e.g., the percentage of CPUs currently used);
Job IDs (e.g., all the jobs currently processed by the computer); and
CPU utilization per job.

In an aspect, the Processing Status information can be gathered from the DFS file manager node and from the process monitor.

SLA Policy/QoS requirements 610: In an aspect, through virtualization, multiple virtual DFS clusters can be created on the same cluster of physical computers in a data center. The Service Level Agreement (SLA) Policy/QoS describes how traffic for different users will be queued and processed by the network and describes the performance guarantees promised to different users. Accordingly, a data center operator may offer different service levels, possibly described by an SLA with certain QoS targets, to account for different user needs and budgets. For example, a Bronze SLA level user may purchase the services of a virtual DFS cluster with a best effort type of service that does not have any QoS guarantee, a Silver SLA level user may use the services of a virtual DFS cluster with prioritized traffic processing but without any QoS performance guarantee, and a Gold SLA level user may use a virtual DFS cluster with guaranteed network throughput, latency and jitter QoS performance guarantees at a higher monetary cost. In an aspect, the table below describes an alternative example where different service level agreements (SLAs) are guaranteed with different QoS targets and different processing priorities guaranteed.

TABLE 1

SLA Policy/QoS Parameters Example

| Service Level (SLA) | Throughput | Packet Loss | Packet Delay | Processing Priority |
|---|---|---|---|---|
| Gold | >=100 Mbps | <=0.0001% | <=2 ms | High |
| Silver | >=10 Mbps | <=0.01% | <=5 ms | Medium |
| Bronze | >=5 Mbps | <=1% | <=10 ms | Low |

Block Placement Policy 620: In an aspect, the block placement policy includes a set of rules specifying how many replicas of a DFS block should be created and where the replicas of the block may be placed. In one example, a default block placement policy may specify that three replicas of a block should be placed in at least two different racks of the cluster and that two of the three replicas should be located in the same rack. In another example, a block placement policy may specify that five replicas of a block be placed in at least three racks and that at least two replicas should be placed in the same rack.

Returning to FIG. 6, the enhanced DFS block placement module 600 generates two outputs, Placement Decision 630 and Network Control 640. Placement Decision 630 indicates a sequence of storage nodes where the block should be replicated. For a block in a file configured with a replication factor R, Placement Decision 630 is a sequence of R computer IDs (storage nodes $N_1, N_2, \ldots N_R$) in which each computer ID identifies a storage node in the cluster. The generation of Placement Decision 630 by enhanced DFS block placement module 600 is discussed in more detail below.

In an aspect, Network Control 640 includes instructions for the SDN controller to prepare the cluster network for the traffic that will be generated for transferring and storing blocks according to the block replication pipeline specified in the Placement Decision. For example, Network Control 640 may include instructions for the SDN controller to create flow entries in the network nodes so that the required block replication network traffic is transported in one or more network paths that avoid congested network segments. Alternatively, Network Control 640 may include instructions for the SDN controller to assign or adjust the priority of a traffic flow associated with the replication of a DFS file block. In another example, the Network Control 640 can include instructions for the SDN controller to activate and optionally reserve additional network capacity by aggregating a new network connection between a top of rack (ToR) switch and a core switch to avoid potential congestion that might be caused by required block replication traffic. Additional network capacity may be provisioned, for example, using the Link Aggregation Control Protocol (LACP, as defined in IEEE 802.1ax) between two nodes. Network capacity may be reserved for the upcoming transfer using for example, the Resource Reservation Protocol (RSVP) or Resource Reservation Protocol-Traffic Engineering (RSVP-TE) protocols.

In an aspect, network capacity may be reserved using explicit traffic policing algorithms in SDN enabled network nodes. For example, in a SDN enabled network node that supports OpenFlow Spec. 1.3, a meter table with ID meter_id can be created to drop any packet after the data rate exceeds a threshold. Additionally a flow entry with an instruction "Meter meter_id" can be added to the flow table to match each direction of the TCP traffic generated by the file block replication pipeline. The new flow entry and meter table together may effectively limit the bandwidth available to the file block replication traffic flow. Network capacity may be effectively reserved by: (a) enforcing bandwidth limits for all of the traffic flows; and (b) making sure the total bandwidth limit of all the traffic flows in each network node does not exceed the total output bandwidth for egress network connection.

Figure 7:
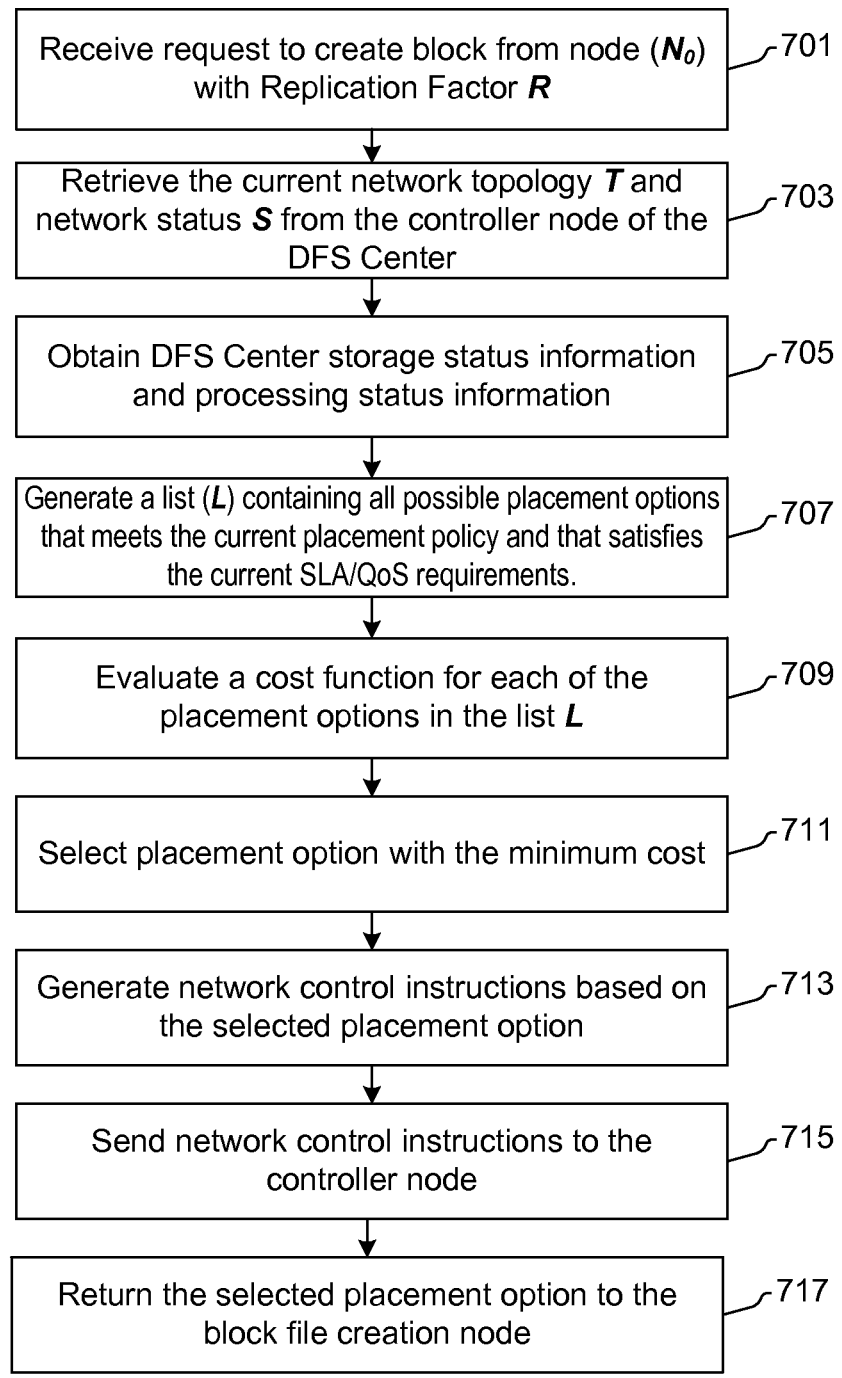
FIG. 7 is a flowchart depicting an enhanced block placement algorithm in accordance with aspects of the invention.

FIG. 7 is a flowchart depicting an enhanced block placement algorithm in accordance with aspects of the invention. An example of the generation of Placement Decision 630 by enhanced DFS block placement module 600 is now discussed in more detail with regard to FIG. 7. In step 701 of FIG. 7, a DFS client sends a new block request to the file manager node to create a new file block. In an aspect, the request may be from a DFS utility that imports a large file from outside of the cluster. In an aspect, the client may also be a data processing task (e.g., MapReduce task in Hadoop) that requests to write the processing output to a file in the DFS. The request to create a new block may be for the first block of a file, or for a new block to be appended to an existing file. In an aspect, the file manager node then sends a block placement request to the enhanced DFS block placement module, in which the block placement request includes the following information: the ID of the customer, the node ID $N_0$ of the client, the size of the file block and the replication factor (R) of the file. The file manager node may determine this information from the new block request it received from the DFS client.

In step 703, the enhanced DFS block placement module retrieves the network topology and real time network status from, for example, the SDN controller of the cluster or from one or more other sources of network information in the cluster (e.g., a network or element management system). In an aspect, the enhanced DFS block placement module may obtain this information in real time when the client requests the creation of a block. In another aspect, the enhanced DFS block placement module may request this information from the SDN controller periodically and then use the last updated network topology and network status when the client requests the creation of a block. In another aspect, the SDN controller may send this information to the enhanced DFS block placement module periodically or at a time when the network topology or network status changes. For example a node addition or removal in the cluster may trigger the SDN controller to send an updated topology to the enhanced DFS block placement module. Similarly, the determination that a bandwidth utilization of a network link crosses a threshold (e.g., >95% utilized for >1 minute) may trigger a network status update. Hybrid solutions also may be used. For example, the network topology may be sent by the SDN controller only when network topology changes are made, but the network status may be queried by the enhanced DFS block placement module as required. With the network topology and real time network status, the enhanced DFS block placement module can evaluate and compare different block placement options.

In step 705, the enhanced DFS block placement module obtains the current storage status and processing status from the file manager node and from the process monitor of the cluster. In other aspects, the enhanced DFS block placement module may obtain the current storage status and processing status directly from each computer in the cluster.

Next, in step 707, the enhanced DFS block placement module generates a list L of possible block placement options that satisfies the current placement policy and the SLA/QoS requirements for the user. A block placement option indicates the R computers in which to store the block replicas and indicates the networking nodes and their network ports used to transport the block replication traffic.

In one aspect, the enhanced DFS block placement module may first generate a list $L_A$ of all possible block placement options using graphs. The network topology can be used to create a graph using all of the computers and network nodes as graph vertices and the network connections of the cluster as graph edges. Every path connecting the client node and R computers in the graph is a possible block placement option. For example, with reference to the block replication placement shown in FIG. 4, a possible path (Path1) is formed by connecting the following computers and network nodes in the order shown below:

Client;
ToR switch 3;
Core switch 1;
ToR switch 1;
Storage node 1;
ToR switch 1;
Core switch 1;
ToR switch 2;
Storage node 4;
ToR switch 2; and
Storage node 5.

A different path (Path2) with the same 3 storage nodes above can be formed by using core switch 2 instead of core switch 1 in the order shown below:

Client;
ToR switch 3;
Core switch 2;
ToR switch 1;
Storage node 1;
ToR switch 1;
Core switch 2;
ToR switch 2;
Storage node 4;
ToR switch 2; and
Storage node 5.

Path1 and Path2 in the above example are both possible block placement options. All of the possible block placement options in a graph can be created using known graph traversal algorithms.

From the list $L_A$ of all possible block placement options the enhanced DFS block placement module removes those options that are not consistent with the block placement policy, resulting in list $L_P$. For example, if the block placement policy requires that the replicas of a block be placed in at least two racks, the options that contain all of the R computers in a single rack will be removed. In another example, if the block placement policy requires that the replicas of a block be placed in at least three racks, then all the options that contain all of the R computers in a single rack or in only two racks will be removed.

In an aspect, the block placement options that are not consistent with block placement policy can also be excluded from the list of all possible block placement options as it is being generated. For example, if the list of all possible block placement options is being created using a graph traversal algorithm and the block placement policy requires that the replicas of a block be placed in at least two racks, and the current path being traversed already includes two computer nodes in a single rack, the graph traversal algorithm can remove all other computers in the same rack from its set of computer nodes to be traversed, and as a result the graph traversal algorithm generates a list of placement options that are consistent with the block placement policy.

The enhanced DFS block placement module next removes from $L_P$ those block placement options that would cause any user's SLA Policy/QoS guarantee to be violated if the DFS file block is replicated through the network path described by that block placement option, resulting in list L. For each block placement option, the enhanced DFS block placement module examines the network status on all network nodes used in the block placement option, and determines if the SLA policy/QoS guarantee for any current traffic flow in any network node would be violated. If the SLA policy/QoS guarantee for any current traffic flow would be violated on any network node by replicating the DFS file block through the network path, the block placement option will be removed. For example, referring to the block placement depicted in FIG. 4, the network status for ToR switch 3, core switch 1, ToR switch 1, ToR switch 2 will be examined for the block placement option Path1 described earlier. On each of these network nodes, the network status information will provide detailed information on each traffic flow along the network path. For example, ToR switch 1 may contain network status information such as the following:

TABLE 2

Network Status in ToR switch 1

| Traffic Flow ID | Ingress Port | Egress Port | Customer ID | Job ID | Bandwidth Reserved |
| --- | --- | --- | --- | --- | --- |
| FLOW_1 | 1 | 10 | CustomerA | JOB_X | 100 Mbps |
| FLOW_2 | 2 | 10 | CustomerB | JOB_Y | 200 Mbps |
| FLOW_3 | 3 | 10 | CustomerC | JOB_Z | 400 Mbps |

In Table 2 above, port 1, 2 and 3 of ToR switch 1 are the ports that connect to storage node 1, 2 and 3 respectively, and port 10 of ToR switch 1 is the port that connects to Core Switch 1. In this example, CustomerA, CustomerB and CustomerC have services with different SLA policy/QoS guarantees, and as a result the traffic flows FLOW_1, FLOW_2 and FLOW_3 are guaranteed 100 Mbps, 200 Mbps, and 400 Mbps of bandwidth on egress port 10, respectively. Since placement option Path1 requires replicating the block from storage node 1 to storage node 4, a new traffic flow from port 1 to port 10 will need to be added in ToR switch 1, and the new traffic flow will only have a maximum of 300 Mbps available if the egress port can only support a maximum of 1 Gbps. If the SLA policy/QoS guarantee for the current customer requires 400 Mbps reserved bandwidth, placement option Path1 will be removed because it would violate the current customer's SLA/QoS guarantees. In an aspect, a placement option that would violate the current customer's SLA/QoS guarantees is marked as inadequate and, in the case that all placement options are marked inadequate, the placement option that least violates the current customer's SLA/QoS guarantees may be selected.

In an aspect, the block placement options that would cause any user's SLA Policy/QoS guarantee to be violated can also be excluded from the list of all possible block placement options as it is being generated. For example, when the list of all possible block placement options is created using a graph traversal algorithm, the enhanced DFS block placement module examines the network status for each of the network nodes to be traversed from the current network path, and determines if the SLA policy/QoS guarantee for any current traffic flow in the network node would be violated. If the SLA policy/QoS guarantee for any current traffic flow would be violated, the network node is removed from the set of nodes to be traversed. As a result the graph traversal algorithm generates a list of placement options that would not violate any user's SLA Policy/QoS guarantee.

It should be appreciated that the order of the above-described sub-steps associated with step 707 may be changed. For example, the block placement options that violate users' SLA policy and/or QoS guarantee requirements can be removed first, and then the block placement options that violate the block placement policy can be removed. In an aspect, some or all of the sub-steps may be combined with subsequent steps in the process. Similarly, some of the sub-steps may be eliminated, such as the filtering of the list of block placement options by SLA and/or QoS. In addition, it should be appreciated that other algorithms can be utilized in enhanced DFS block placement module for generating a list L of block placement options. In an aspect, enhanced DFS block placement module may generate only a partial list L of block placement options, or enhanced DFS block placement module may generate a truncated list L of block placement options by stopping after a fixed or variable time interval before all possible block placement options are generated. In an aspect, the functions of steps 707 and 709 (discussed in detail below) may be combined such that a cost function is evaluated to determine a cost valuation parameter for each possible placement option before it is placed in the list L and if the cost valuation parameter for that possible placement option exceeds a threshold then the possible placement option is not included in the list L. Otherwise, the possible placement option is included in the list L if it also satisfies the current block placement policy and the current SLA/QoS requirements.

In step 709, the enhanced DFS block placement module evaluates a cost function to determine a cost valuation parameter for each of the block placement options in the list generated in step 707. A cost function cost( ) is defined so that the enhanced DFS block placement module can evaluate and rank different block placement options quantitatively in order to maximize performance. Performance, in this context, may refer to one or more block placement service characteristics such as placement speed, reliability, repeatability and effect of the placement on the cluster. For a cluster of N nodes with each node assigned a unique ID, the inputs to the cost function may include one or more of the following items:

Block Placement Request (BPR): The block placement request received from the file manager node;
Current placement option (CPO): The placement option to be evaluated. The placement option includes the ID of the client node ($N_0$), the R computers nodes, the network nodes and their network ports that are used to transport the block replication traffic. The R computer nodes can be denoted as ($I_1, I_2, \ldots, I_R$) where $I_1$ is the ID of the first computer node of the block placement option, $I_2$ is the ID of the second computer node, . . . , and $I_R$ is the ID of the last computer node;
Cluster topology (CT);
Network status (NS); and
Storage status (SS) and processing status (PS).

The cost function cost( ) returns a quantitative value (a cost valuation parameter) indicating the cost of replicating the block for the current customer according to the current placement option being considered. The returned cost valuation parameter may be calculated via a summation of the three terms as shown below.

$$\text{cost}(BPR,CPO,CT,NS,SS,PS) = \text{weight}_{network} \times \text{cost}_{network}(BPR,CPO,CT,NS,SS,PS) + \text{weight}_{storage} \times \text{cost}_{storage}(BPR,CPO,CT,NS,PS) + \text{weight}_{processing} \times \text{cost}_{processing}(BPR,CPO,CT,NS,SS,PS)$$

Where $\text{cost}_{network}$, $\text{cost}_{storage}$ and $\text{cost}_{processing}$ indicate the network cost, storage cost and processing cost associated with replicating the block, and $\text{weight}_{network}$, $\text{weight}_{storage}$ and $\text{weight}_{processing}$ are coefficients that can be used to adjust how the network cost, storage cost and processing cost contribute to the output of the cost function cost( ). Different functions for $\text{cost}_{network}$, $\text{cost}_{storage}$ and $\text{cost}_{processing}$ may be defined so that cost( ) may indicate any combination of the network cost, storage cost and/or processing cost. For example, $\text{cost}_{storage}$ and $\text{cost}_{processing}$ may be defined to always return 0 so that cost( ) only includes the network cost, $\text{cost}_{network}$, associated with the current block placement option. In another example, $\text{cost}_{network}$ and $\text{cost}_{processing}$ may be defined to always return 0 so that cost( ) only includes the storage cost, $\text{cost}_{storage}$, associated with the current block placement option.

Different functions for $\text{cost}_{network}$, $\text{cost}_{storage}$ and $\text{cost}_{processing}$ may be created or tuned to support different objectives. For example, if the objective is to minimize network traffic in the cluster, the output of $\text{cost}_{network}$ may be the number of network segments or links used to transfer the block replication traffic:

$$\text{cost}_{network}(BPR,CPO,CT,NS,SS,PS) = \text{hop\_count}(CPO)$$

where hop_count(CPO) returns the number of network hops used in the current block placement option (CPO) under consideration. In an aspect, as a variation of this example, if network traffic involving the core switches in the data center requires higher monetary cost than traffic involving ToR switches, the cost function can use a higher weight for traffic that would need to travel across the core network switches and lower weight for the traffic that would need to travel across the ToR switches.

In another aspect, the objective is to balance the storage utilization across the cluster, and so $\text{cost}_{storage}$ may be defined as:

$$\text{cost}_{storage}(BPR, CPO, CT, NS, SS, PS) = \sum_{i=1}^{R} \left| \frac{\text{storage\_used}(I_i)}{\text{total\_storage}(I_i)} - \text{average\_utilization}(CPO, SS) \right|$$

where average_utilization(CPO,SS) is the average storage utilization of all the computer nodes in the cluster, ($I_1, I_2, \ldots, I_R$) are the IDs of the R computer nodes in the current placement option, storage_used($I_i$) is the total amount of storage used in computer node $I_i$ and total_storage ($I_i$) is the total amount of storage installed in computer node $I_i$.

In another aspect, the placement objective is to minimize replication time, and so the output of $\text{cost}_{network}$ may be the time it takes to complete the placement of the block replicas. Since the block is replicated in a pipeline fashion, the block is transferred across all of the network hops as specified in the current block placement option. The time it takes to complete the block replication is the time it takes to transfer the block across the network hop with the lowest bandwidth available to the current customer. Accordingly, in this aspect, $\text{cost}_{network}$ may be defined as:

$$cost_{network}(BPR, CPO, CT, NS, SS, PS) = \frac{block\_size(BPR)}{lowest\_available\_bandwith(CPO)}$$

in which:

block_size(BPR)=the size of the current HDFS file block lowest_available_bandwidth(CPO)=the lowest available bandwidth to the current customer on all the network hops used in the current block placement option.

In an aspect, the lowest available bandwidth may be obtained through the SDN services by retrieving network capacity reservation information via a SDN function call. In another aspect, the lowest available bandwidth may be obtained through the SDN services by retrieving average network percentage utilization information via a SDN function call. In another aspect, the lowest available bandwidth may be obtained from utilization of a network diagnostic probe from which available bandwidth information can be determined.

In a further aspect, the cost function may also be defined to minimize the energy consumption of the block replication associated with the block placement option. In this case, the cost functions $cost_{network}$, $cost_{storage}$ and $cost_{processing}$ may be calculated by summing the amount of energy (e.g., joules) or power (e.g., watts) required to transfer, store and process the data block replicas associated with the current block placement option (CPO).

For example, $cost_{network}$ may be a summation of the energy or power used per bit transferred by each port of each network node participating in the CPO. In another example, $cost_{storage}$ may be a summation of the energy or power used per byte stored by each storage device (e.g., hard disk drive, solid state drive, etc.) participating in the CPO. Further, $cost_{processing}$ may be a summation of the energy or power used per processing unit. For example, $cost_{processing}$ may be defined in terms of joules per million instructions per second (MIPS), or watts per million floating point operations per second (MFLOPS).

In an aspect, the above energy/power information may be obtained from the device manufacturer and stored in each device or in the device's management system. In an aspect, the information may be provided to the enhanced DFS block placement module via the cluster topology input from an SDN controller, an element management system or an alternative management method.

In an another aspect, $cost_{network}$ may be calculated by summing the average or maximum power consumption of the device(s) containing each network port used in the CPO, with an equation for network cost as follows:

$$cost_{network} = \Sigma_{i=1}^{n} P_i$$

in which n=the number of network ports involved in the CPO, and $P_i$=the average or maximum power dissipation (e.g., watts) of the device containing port i.

For example, consider two possible paths in which both paths traverse a total of 6 ports through two switches, as follows:

PathA: Computer 1=>Switch 1 (Port 0)=>Switch 1 (Port 1)=>Switch 2 (Port 0)=>Switch 2 (Port 1)=>Computer 2

PathB: Computer 1=>Switch 1' (Port 0)=>Switch 1' (Port 1)=>Switch 2' (Port 0)=>Switch 2' (Port 1)=>Computer 2

Further consider the following average power dissipation of each device:

Computer 1 100 watts;
Computer 2 100 watts;
Switch 1 100 watts;
Switch 2 100 watts;
Switch 1' 150 watts;
Switch 2' 150 watts;

so that, using the equation above, the cost for PathA and PathB would be 600 and 800, respectively.

In another aspect, the network cost may be calculated as the sum of the average or maximum power consumption of the device(s) containing each network port, normalized by the number of device ports, as follows:

$$cost_{network} = \Sigma_{i=1}^{n} P_i / numports_i$$

in which $P_i$=the average or maximum power dissipation (e.g., watts) of the device containing port i, and $numports_i$=the number of network ports on device containing port i.

In another aspect, the cost function may be calculated by summing the incremental power consumed by each port used in the CPO. This may be calculated, for example, using the following equation:

$$cost_{network} = \Sigma_{i=1}^{n} (P_{max,i} - P_{idle,i}) / numports_i$$

in which:

$P_{max,i}$=the maximum power dissipation of the device containing port i (i.e. the power dissipation with all ports operating at full line rate);

$P_{idle,i}$=the idle power dissipation of the device containing port i (i.e. the power dissipation with all ports idle); and $numports_i$=the number of network ports on the device containing port i.

Further, the cost function may be normalized based on port speed, as follows:

$$cost_{network} = \Sigma_{i=1}^{n} (P_{max,i} - P_{idle,i}) / (numports_i \times portspeed_i)$$

in which:

$P_{max,i}$=the maximum power dissipation of the device containing port i (i.e. the power dissipation with all ports operating at full line rate);

$P_{idle,i}$=the idle power dissipation of the device containing port i (i.e. the power dissipation with all ports idle);

$numports_i$=the number of network ports on the device containing port I; and $portspeed_i$=the line rate of network port i, as measured, for example, in Gbps.

In an aspect, the idle, average and maximum power consumption specifications for devices in the cluster may be obtained from the device manufacturer and may be stored on a network device or within a network management system. These specifications may be provided to the enhanced DFS block placement module via the cluster topology input from an SDN controller, element management system or other management entity in the cluster. One skilled in the art will appreciate that the "device containing port i" may refer to various forms factors including but not limited to: rack mounted enclosure, network cards/blades, network modules, SFP (small form factor pluggable) and NIC (network interface card).

In another aspect, the objective is to balance the network utilization across the cluster, and so $cost_{network}$ may be defined as:

$$cost_{network}(BPR,CPO,CT,NS,SS,PS) = \Sigma_{i=1}^{n} weight(CT, L_i) \times |link\_utilization(L_i) - average\_network\_utilization(CT,NS)|$$

where: $(L_1, L_2, \ldots, L_n)$ are the network links used in the block replication pipeline for the current placement option;

link_utilization($L_i$) is the current bandwidth utilization of network link $L_i$; average_network_utilization(CT,NS) is the average network utilization of all the network links in the cluster; and weight(CT, $L_i$) is a coefficient for network link $L_i$. In this definition of $cost_{network}$, weight(CT, $L_i$) allows different network links to contribute differently to the output of $cost_{network}$, depending on the location and/or type of network link $L_i$ in the cluster. For example, a first network link between a computer and a ToR switch and a second network link between a ToR switch and a core switch can each have a different weight and thereby contribute differently to the output of $cost_{network}$. In an aspect, link_utilization and average_network_utilization may be normalized by dividing current link utilization (e.g., in Mbps) by the maximum link capacity (e.g., the port speed in units of Mbps), thereby allowing a cost function to be evaluation for networks with different link speeds.

Figure 8:
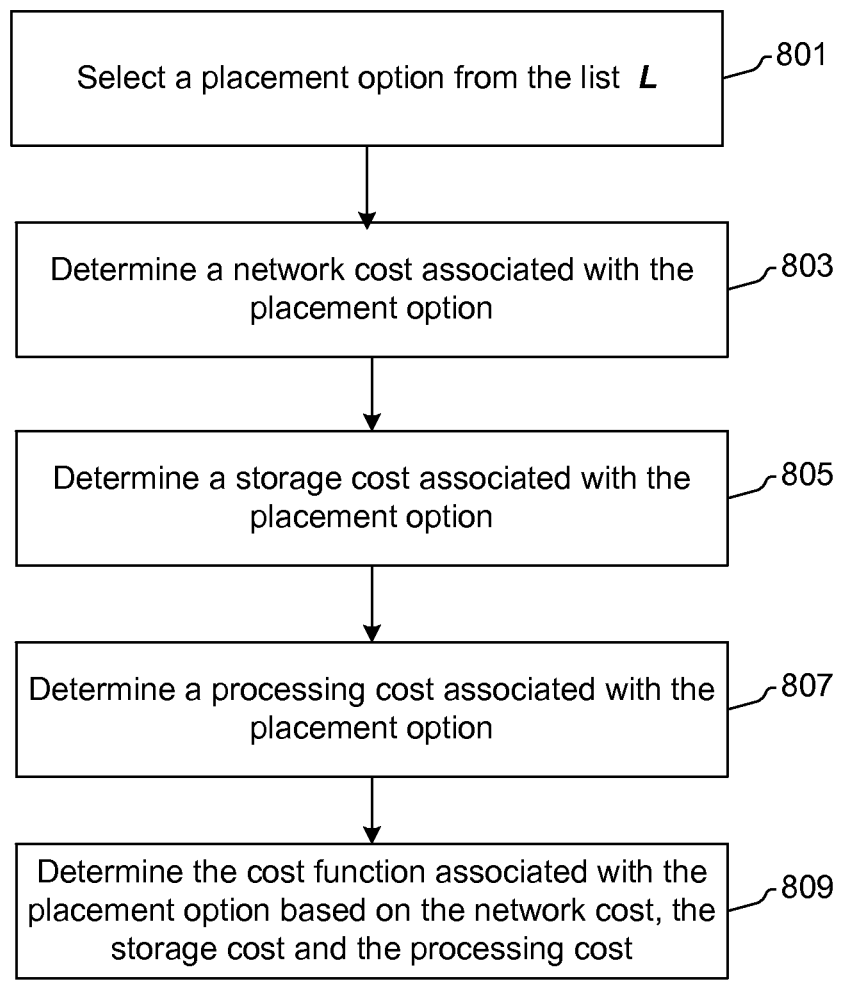
FIG. 8 is a flowchart depicting the determination of a cost function associated with a block placement option in accordance with aspects of the invention.

FIG. 8 is a flowchart depicting the determination of a cost function associated with a block placement option in accordance with aspects of the invention. FIG. 8 provides a summary of the sub-steps of step 709 of FIG. 7, as discussed above. In step 801, a block placement option is selected from the list of block placement options L. In an aspect, the block placement option may be selected from the list in order, or may be selected based on criteria such as the number of racks involved in the block placement option, etc. In step 803, a network cost, $network_{cost}$, as described above, is determined for the associated selected block placement option. A storage cost, $storage_{cost}$, as described above, is determined for the associated selected block placement option in step 805. In step 807, $processing_{cost}$, as described above, is determined for the associated selected block placement option. Lastly, a cost valuation parameter, cost( ), is determined in step 809 for the selected block placement option based on the determined $network_{cost}$, $storage_{cost}$, and $processing_{cost}$, as described above. It should be appreciated that the order of steps shown in FIG. 8 is exemplary, and the steps may be performed in other orders or combinations.

In an aspect, other inputs may be included in the calculation of the cost functions. For example, if the cost functions attempt to account for monetary cost that depends on when the block is replicated, the current time can be added as an input to the cost functions. Similarly, the cost function may extended to include the financial cost of using a particular hop (or network node port), because the operating cost of each device may differ, especially in a network which may have components managed by more than one service provider. In another aspect, different brands or models of network switches maybe be used together in the cluster network at the same time, and some brands or models of network switches may be less reliable than the others (due to brand reputation, well known benchmarks, observed performance, etc.), and it is preferable to use the more reliable network switches. The brand and model of the network switches and their reliability metrics may be included in the calculation of the cost function so that the cost of using less reliable network switches is higher, and the cost of using more reliable network switches is lower.

In an aspect, the $cost_{processing}$ may be determined based on processing capabilities associated with each processing unit which may be measured in MIPS, Megaflops, or another indicator of such processing capabilities. In an aspect, the $cost_{processing}$ may be determined based on the current utilization (before implementation of the placement option) of the processing capabilities associated with each processing unit, which may be reported by the operating system (OS) of the processing unit.

In an aspect, functions for $cost_{network}$, $cost_{storage}$ and $cost_{processing}$ may be created or tuned to support multiple objectives. Mathematical terms representing each objective may be weighted by a coefficient (set to reflect by each objective's relative importance) and then summed to form the final cost function (e.g., $cost_{network}$). For example, $cost_{network}$ may be calculated to include both the time it takes to complete the block replication and the sum of the average or maximum power consumption of the device(s) containing each network port used in the CPO. Such an equation for network cost is provided, as follows:

$cost_{network}$(BPR,CPO,CT,NS,SS,PS)=
  $weight_{network,time} \times cost_{network,time}$ +
  $weight_{network,power} \times cost_{network,power}$ in which:

$$cost_{network,time} = \frac{block\_size(BPR)}{lowest\_available\_bandwith(CPO)};$$

$cost_{network,power} = \Sigma_{i=1}^{n} P_i$;

$weight_{network,time}$=the weight or coefficient that controls how much $cost_{network,time}$ contributes to $cost_{network}$;

$weight_{network,power}$=the weight or coefficient that controls how much $cost_{network,power}$ contributes to $cost_{network}$;

lowest_available_bandwidth(CPO)=the lowest bandwidth available to the current customer on all the network hops used in the CPO;

block_size(BPR)=the size of the current DFS file block;

n=the number of network ports involved in the CPO; and $P_i$=the average or maximum power dissipation (e.g., watts) of the device containing port i.

Of course, it should be appreciated that the above descriptions of evaluating a cost function to determine a cost valuation parameter associated with a block placement option are exemplary, and that other known cost function algorithms and models may be used as well.

Returning to FIG. 7, in step 711 the enhanced DFS block placement module selects the placement option with the lowest cost, based on the cost valuation parameters determined from the cost function evaluations in step 709. In an alternative aspect, the enhanced DFS block placement module may select the placement option with the lowest cost from the first N placement options that have a cost lower than a threshold. In an aspect, the placement options may be sorted by cost by using a sorting algorithm. Alternatively, status variables may be maintained to track the current minimum cost and the associated block placement option as the cost for each placement option is determined in step 709. As soon as the cost of a block placement option is determined to be higher than the current minimum cost, further cost calculation for the current placement option may be stopped. Then the cost of the next block placement option is determined in the same manner, resulting in the block placement option(s) with the lowest cost (or n lowest costs) being known at the completion of the cost determinations in step 709.

In step 713, the enhanced DFS block placement module generates network control instructions for the SDN controller to prepare the network for transfer of the block replicas for storage according to the selected block placement option from step 711. In an aspect, the network control instructions may be directed to an OAM or EMS system/device in the cluster. In an aspect, the enhanced DFS block placement module may generate network control instructions to direct the SDN controller to generate OpenFlow instructions for switches, routers or other devices in the network. In an aspect, the enhanced DFS block placement module may generate network control instructions to request the SDN controller to establish OpenFlow flow entries in the network nodes so that the block replication network traffic follows the specific path as defined by the selected block placement option. For example, if the selected block placement option is Path2 as described above in step 707, the enhanced DFS block placement module may generate network control instructions to request the SDN controller to set up flow entries in ToR switch 3, core switch 2, ToR switch 1, and ToR switch 2. In this example, flow entries in core switch 2 are established so that:

Block replication data packets from Client node through ToR switch 3 are forwarded to ToR switch 1;

Block replication confirmation packets from storage node 1 through ToR switch 1 are forwarded to ToR switch 3;

Block replication data packets from storage node 1 through ToR switch 1 are forwarded to ToR switch 2; and Block replication confirmation packets from storage node 4 through ToR switch 2 are forwarded to ToR switch 1.

In an aspect, the enhanced DFS block placement module may update the stored network status information so that flow entries created in this step are included with the latest status information such as customer ID, job ID and other flow configuration and reservation information. In an aspect, the enhanced DFS block placement module may generate network control instructions to modify existing OpenFlow entries in different network nodes through the SDN controller in order to accommodate the incoming block replication traffic. The enhanced DFS block placement module may generate network control instructions to modify processing priorities of existing traffic flows in different network nodes. For example, when a new block replication is requested from a client with higher service level, and there exist other traffic flows being processed for clients with a lower service level, the enhanced DFS block placement module may generate network control instructions to decrease the priorities for the existing traffic flows so that the traffic for the new block replication receives prioritized processing.

In an aspect, the enhanced DFS block placement module may modify other QoS parameters such as bandwidth reservations on existing traffic flows so that the traffic flow for the new block replication can be assigned appropriate QoS parameters. For example, if a new traffic flow from port 4 to port 10 needs to be created for CustomerD in the ToR switch 1 as shown above in Table 2, and the new traffic flow must be reserved at a bandwidth of 400 Mbps, and according to CustomerC's SLA Policy/QoS guarantee the bandwidth reserved for FLOW_3 can be reduced to 300 Mbps, the enhanced DFS block placement module may create a new traffic flow FLOW_4 for CustomerD and at the same time modify traffic flow FLOW_3 to reduce its bandwidth reservation from 400 Mbps to 300 Mbps. The table below shows the modified existing traffic flow FLOW_3 and the new traffic flow FLOW_4 for this example.

TABLE 3

Adding New Flow and Modifying Existing Flow in ToR Switch 1

| Traffic Flow ID | Ingress Port | Egress Port | Customer ID | Job ID | Bandwidth Reserved |
| --- | --- | --- | --- | --- | --- |
| FLOW_1 | 1 | 10 | CustomerA | JOB_X | 100 Mbps |
| FLOW_2 | 2 | 10 | CustomerB | JOB_Y | 200 Mbps |
| FLOW_3 | 3 | 10 | CustomerC | JOB_Z | 300 Mbps |
| FLOW_4 | 4 | 10 | CustomerD | JOB_D | 400 Mbps |

In an aspect, the enhanced DFS block placement module may also reconfigure the network for efficient accommodation of traffic associated with the selected placement option. For example, the enhanced DFS block placement module may generate network instructions to reconfigure how the ToR switches are connected to the core switches. Typically, a ToR switch is connected to a core switch through multiple network connections and those networks connections can be aggregated as multiple trunk groups. Network traffic from/to different computer nodes or different customers can be directed to different truck groups. In an aspect, the enhanced DFS block placement module may generate network instructions to dynamically adjust how many network connections will be aggregated in each trunk group in order to increase/decrease the link capacity of each trunk group.

Figure 9B:
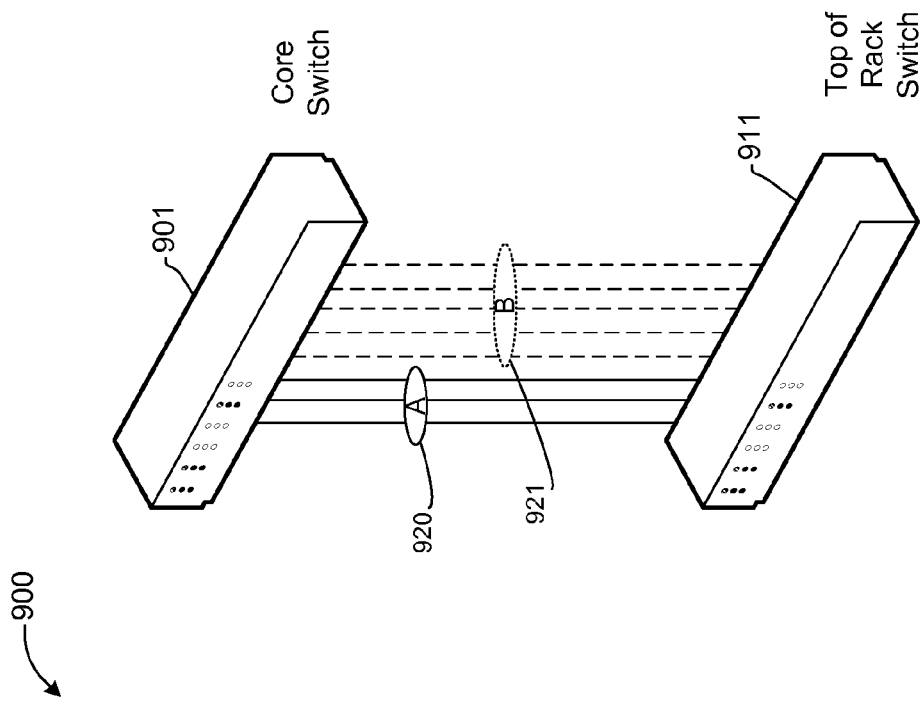
FIGS. 9A and 9B are block diagrams depicting reconfiguration of network connections between a core switch and a top of rack switch in accordance with aspects of the invention.
Figure 9A:
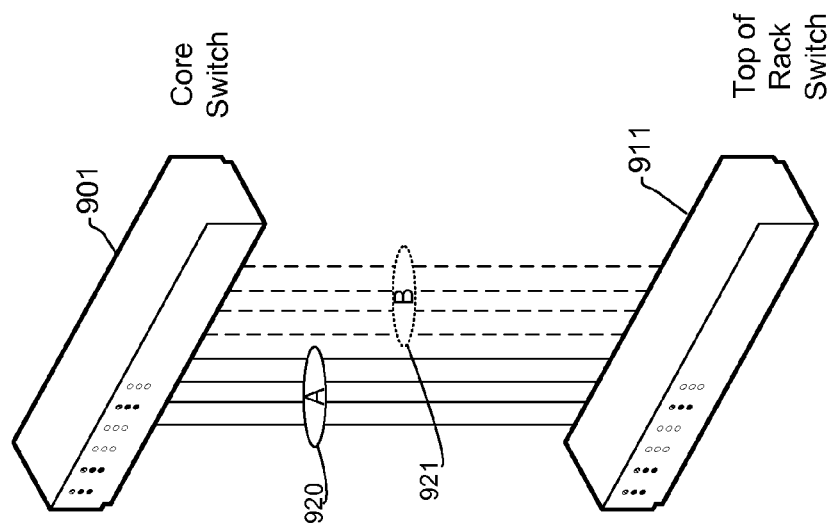

In an aspect, the enhanced DFS block placement module may generate network instructions to move a network connection from an underutilized trunk group to a heavily utilized trunk group in order to increase the link capacity in the heavily utilized trunk group. FIGS. 9A and 9B are block diagrams depicting reconfiguration of network connections between a core switch and a top of rack switch in accordance with aspects of the invention. FIGS. 9A and 9B show a cluster 900 which may be, for example, in the distributed file system network of FIG. 1. Cluster 900 includes a ToR switch 911 is connected to a core switch 901 through 8 Gigabit Ethernet connections, and the 8 connections are configured as trunk group A 920 and trunk group B 921. In FIG. 9A, trunk group A and trunk group B each include 4 Gigabit Ethernet connections each providing a link capacity of 4 Gbps. When the enhanced DFS block placement module determines that the link capacity of trunk group B should be increased to 5 Gbps and trunk group A currently utilizes 3 Gbps or less, the enhanced DFS block placement module reconfigures the network as shown in FIG. 9B in which trunk group A 920 has lost one Ethernet connection and trunk group B 921 has added one Ethernet connection.

Returning to FIG. 7, as described above with regard to step 713, the network control instruction set may configure or modify different elements in the cluster, and/or different performance characteristics associated with different elements, traffic and users of the cluster. It should be appreciated that the descriptions of network instructions provided herein are exemplary, and that such instructions may be performed in other orders or combinations.

In step 715 the enhanced DFS block placement module sends the determined network control instructions to the controller node, which may be an SDN controller or may be an OAM or EMS system/device operating in, or in connection with, the cluster. In this manner, the controller node may operate on the instructions and configure the network accordingly to accommodate the network traffic associated with the selected block placement option. In step 717, the enhanced DFS block placement module returns the sequence of computer nodes (storage nodes) specified in the selected block placement option to the file manager node, and the file manager node then returns the sequence as the block placement decision to the DFS client that initiated the request for a new block to the file manager node.

In aspects described above, the enhanced DFS block placement module executes the steps of FIG. 7 every time a new file block is requested. In another aspect, the enhanced DFS block placement module may be executed for multiple new file blocks at a time, or even for all file blocks of an entire new file at a time. For example, when a DFS client imports a file from a different file system to DFS, it knows the size of the original file and therefore the number of blocks that need to be created and replicated to the DFS cluster. The DFS client may provide the size information to the enhanced DFS block placement module which uses the steps described above to determine and store the selected block placement option for each of the blocks all at once.

In an aspect, the selected block placement option can be returned to the DFS client and the corresponding network controls can be sent to the SDN controller for each block as it is created and replicated. In another aspect, the enhanced DFS block placement module may use the steps described above to determine and return the selected block placement option to the DFS client and to send network control instructions to the SDN controller for a number of blocks at a time, and the number of blocks may be determined by the DFS client or by the enhanced DFS block placement module in accordance with its configuration and/or the configuration and/or the real time status of the cluster network.

In an embodiment, steps 713 and 715 may be omitted. That is, the algorithm depicted in FIG. 7 may be used to determine an improved placement option (step 711) and return the placement option to the block file creation node (step 717) without configuration of any network nodes. In this scenario, routing protocols (e.g., open shortest path first (OSPF), equal-cost multi-path (ECMP)) or load balancing systems, known to one skilled in the art, could determine the accommodation of replication traffic across the network.

Using Link Models in DFS Block Placement

As described above (illustrated, for example, by the network of FIG. 1), the process of file block replication and transfer to designated storage nodes may be conducted using TCP/IP protocols. For example, in HDFS, file blocks are transferred as remote procedure calls over TCP connections. As such, the performance of applications such as HDFS is often strongly correlated to the behavior of TCP/IP in the network. Since the behavior of TCP is reasonably well understood, the performance of such applications may be managed through the use of predictions or models describing how TCP may respond under past, current or expected future situations. Several TCP models are disclosed that may be used, for example, by the systems and methods for DFS block placement described herein. Using one or more TCP models can, for example, improve management of user SLA performance targets and guarantees.

Steady State TCP Behavior

If a network link is used to carry one TCP traffic flow (or "flow"), and that link is the only link used in transport, then the entire link capacity will be available to support the flow in steady-state operation. If a network link is used to carry n flows, and that link is the only link used in transport for all n flows, then in the steady state, each flow may be allocated the link capacity divided by n. Such capacity allocation assumes (a) the use of link scheduling schemes such as stochastic fair queuing with no preferential treatment (e.g., priority) given to any one flow over another and (b) no rate limitation at the source node.

If multiple network links are used to carry n flows, then the throughput of each flow will be governed by the network link which allocates the smallest capacity (the "constraint" link).

Available Bandwidth Calculation, Method 1

Returning to the methods outlined with reference to FIG. 7 and specifically step 709, the lowest available bandwidth of a current placement option (CPO) may be determined by calculating the bandwidth available for a candidate flow for each link in the CPO and then selecting the lowest result. The calculation of the available bandwidth for a candidate flow in a link may use one of the methods described below.

Figure 10:
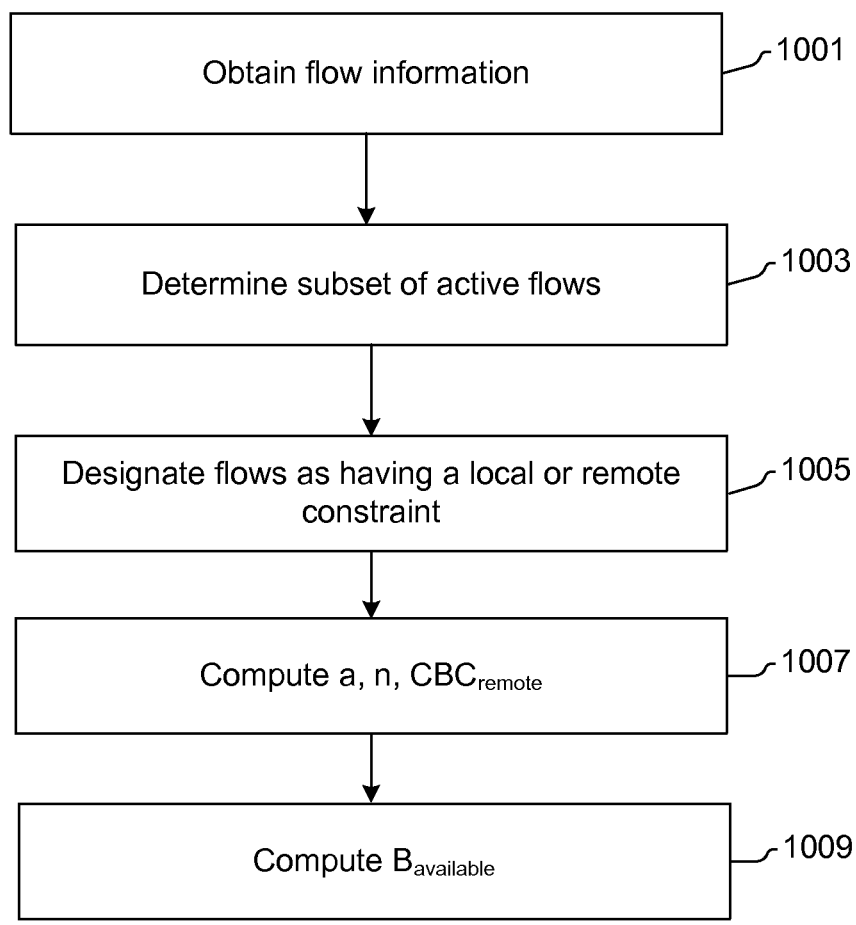
FIG. 10 is a flowchart of a method for prediction of available bandwidth on a link in accordance with aspects of the invention.

FIG. 10 is a flowchart of a method for prediction of available bandwidth on a link in accordance with aspects of the invention. The method may be performed, for example, in combination with the various methods described with reference to FIG. 7 and by the enhanced block placement module of FIG. 6. To provide specific examples, the method will be described with reference to various systems, modules, and methods; however, the method is not so limited.

In an embodiment, the calculation of the available bandwidth of a link for a candidate flow (e.g., one link of a CPO) may be based on the following equation:

$$B_{available} = \frac{C_{link} - \sum_{i=1}^{a} CBC_{remote}(i)}{n - a + 1} \quad \text{(Equation 1)}$$

Where:

$B_{available}$ is the predicted bandwidth or capacity available to the candidate flow, if the candidate flow chooses to utilize this link;

$C_{link}$ is the link capacity (e.g., 1 Gbps);

n is the total number of active flows carried by the link;

a is the total number of active flows carried by this link having a throughput constraint in another link ("remote constraint"); and $CBC_{remote}$ (i) is the Current Bandwidth Consumption (CBC) by the ith active flow with a remote constraint.

Enhanced DFS block placement module 600 of FIG. 6 may obtain $C_{link}$ as input Cluster Topology 660 which may be obtained in step 703 in FIG. 7. Values for n, a, and $CBC_{remote}$ may be determined as described below.

In step 1001, flow information is obtained for each link of the CPO using, for example, the Network Status interface 670. Per link flow information may include a set of unique flow IDs and corresponding CBC of the flow. The CBC of a flow represents the amount of link capacity (e.g., in Mbps) being used by a flow. CBC may be an instantaneous value or calculated as an average across some period of time (e.g., 1 second).

In step 1003, the non-active flows are removed from the set of unique flow IDs. A non-active flow is a flow with zero or very low average demand due, for example, to (a) very low, continuous data transmission, (b) infrequent, bursty data transmission, or (c) a connection that persists following the transport of data. A non-active flow may be determined by comparing the bandwidth consumption of each flow, measured over some time period, to a minimum threshold. Flows below the minimum threshold are considered non-active and are removed from the set.

A fixed threshold may be established a priori based on knowledge of the types and characteristics of flows used in the network. For example, a threshold of 1 Mbps over a 1 second period may be used for a network in which large file transfers are performed and are known to utilize at least 10

Mbps of system capacity. A 1 Mbps threshold thus becomes capable of filtering signaling, control plane or management traffic which often involves very small transactions consuming much less than 1 Mbps over a 1 second period.

Alternatively, statistical processing may be used to determine which flows are non-active. For example, multiple values of bandwidth consumption may be retained for each flow. If the current or recent bandwidth consumption is less than a longer term average consumption, then the flow may be deemed non-active. Alternatively, the threshold may be set to a percentage of the capacity currently consumed by the largest flow. For example, consider a 100 Mbps link carrying 50 flows where 25 of the flows are consuming 3 Mbps each and each of the remaining flows consumes less than 3 Mbps. In such a scenario, the threshold may be set to 5% of the maximum flow consumption of 3 Mbps or 150 kbps.

In an embodiment, the CBC of all flows deemed non-active is summed and stored as $CBC_{non\text{-}active,all}$. In an embodiment, step 1003 is omitted and no flows are removed from the set.

In step 1005, flows are designated as having a local constraint or a remote constraint. A local constraint refers to the situation in which the current link being analyzed is the throughput constraint (or limiter) for a flow. A remote constraint refers to the situation where the throughput constraint of a flow is not the current link being analyzed. For example, the throughput constraint may be a link other than the current link being analyzed, a bandwidth limitation in the data source itself (e.g., an HTTP server) which limits the egress data flow, or bandwidth limitation in the data sink which limits the ingress data flow.

The process to designate each flow as having a local or remote constraint may be based on the steady state nature of TCP operation wherein link capacity will be shared equally across all flows, unless flows are constrained elsewhere.

If the sum of CBCs for all flows on a link is less than the capacity of the link, or alternatively, less than some threshold related to the link capacity (e.g., 95% of link capacity), then all flows on that link may be designated as having a remote constraint. Alternatively, if the sum of CBCs for all active flows on a link is less than some threshold related to link capacity, then all active flows on that link may be designated as having a remote constraint. The threshold, for the latter case, may be a static parameter, determined heuristically, or may be dynamic and based, for example, on the number of non-active flows and the sum of CBCs for all non-active flows. For example, if the sum of CBCs on a 1000 Mbps link for all non-active flows is 100 Mbps, then the threshold may be set to 900 Mbps.

If in the above scenarios, the sum of CBCs is equal to the capacity of the link, or greater than a threshold, then one or more flows are locally constrained. In such a link, all flows with a CBC equal (or approximately equal, for example, within 1% or 5%) to the bandwidth consumption of the flow with the maximum CBC for that link may be designated as having a local constraint. All remaining flows may be designated as having a remote constraint.

Alternatively, flows may be designated as having a local constraint if they have a CBC similar to, but not equal to, the bandwidth consumption of the flow with the maximum CBC. For example, a flow may be designated as having a local constraint if it has a CBC above a minimum threshold value, where the threshold may be a function of the CBC for the flow having the maximum CBC. For instance, the threshold may be 95% of 325 Mbps, where 325 Mbps is the CBC for the flow having the maximum CBC of the link.

In step 1007, values for a, n and $CBC_{remote}$ are determined. The value n is the number of active flows for each link and may be determined by totaling the number of flows remaining in the set following step 1003. The value of a is the number of active flows having a remote constraint, and may be determined by totaling the number of flows identified as having a remote constraint in step 1005. The values of $CBC_{remote}$ are the subset of bandwidth consumptions (obtained in step 1001) for each active flow having a remote constraint. One skilled in the art would appreciate that the set of flows and the corresponding designations of a flow being active and having a local or remote constraints may be implemented in a various ways, including in a table or database stored in memory.

In step 1009, $B_{available}$, the bandwidth (or capacity) available to a candidate flow, may be calculated using Equation 1.

In an embodiment, the effect of the non-active flows, may be included in the calculation of $B_{available}$, by using Equation 2 in step 1009 instead of Equation 1.

$$B_{available} = \frac{C_{link} - CBC_{non\text{-}active,all} - \Sigma_{i=1}^{a} CBC_{remote}(i)}{n - a + 1} \quad \text{(Equation 2)}$$

In an alternative embodiment, the method above may be simplified by ignoring the distinction between flows having local or remote constraints. For example, steps 1005 and 1007 of FIG. 10 may be omitted and $B_{available}$ may be calculated using Equation 3 or 4:

$$B_{available} = \frac{C_{link}}{n + 1} \quad \text{(Equation 3)}$$

$$B_{available} = \frac{C_{link} - CBC_{non\text{-}active,all}}{n + 1} \quad \text{(Equation 4)}$$

Available Bandwidth Prediction, Method 2

Figure 11:
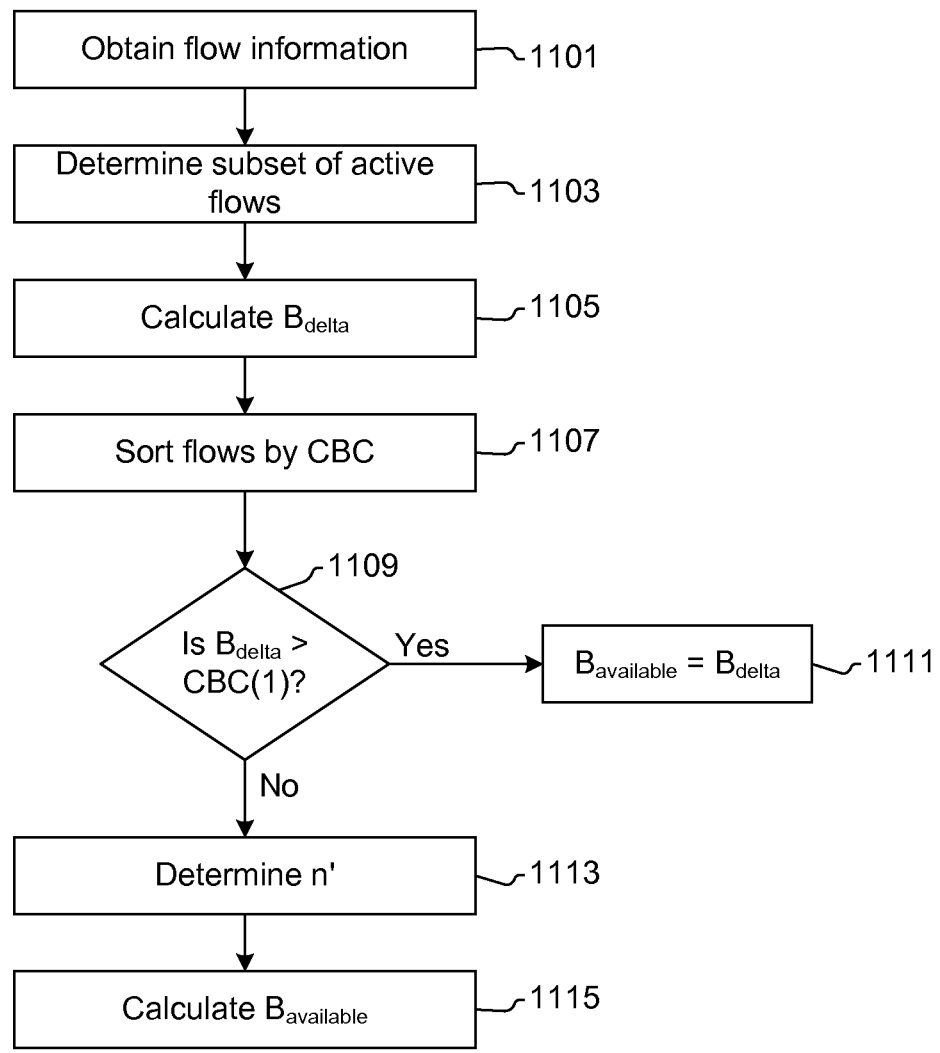
FIG. 11 is a flowchart of another method for prediction of available bandwidth on a link in accordance with aspects of the invention.

FIG. 11 is another flowchart of a method for prediction of available bandwidth on a link in accordance with aspects of the invention. The method may be performed, for example, in combination with the various methods described with reference to FIG. 7 and by the enhanced block placement module of FIG. 6. To provide specific examples, the method with be described with reference to various systems, modules, and other methods; however, the method is not so limited.

In step 1101, flow information is obtained. Step 1101 may be same as or similar to step 1001 of the method of FIG. 10. In step 1103, non-active flows are removed from the set of unique flow IDs. Step 1103 may be the same as or similar to step 1003 of the method of FIG. 10. Similar to the method of FIG. 10, step 1103 may be omitted from the method of FIG. 11.

In step 1105, a variable, $B_{delta}$, is assigned the value of $C_{link}$ minus the sum of CBC for all active flows. Alternatively, $B_{delta}$ may be assigned the value of $C_{link}$ minus the sum of CBC for all flows (active and non-active).

In step 1107 the active flows are sorted by CBC in descending order. The active flow with the highest CBC may be designated as CBC(1) and may be referred to as the flow with a CBC having an index of one. The lowest CBC is CBC(n). This flow may be referred as the flow with a CBC having an index of n.

In step 1109, the value of $B_{delta}$ is compared to CBC(1). Alternatively in step 1109, the value of $B_{delta}$ may be compared to CBC(1) plus a delta factor, where the delta factor is intended to filter sampling noise in a real-world system. The delta factor may be an absolute bandwidth or rate (e.g., 10 Mbps) or may be a function of CBC(1), for example, a percentage of CBC(1) such as 10% of CBC(1).

If the value of $B_{delta}$ is greater than CBC(1) or CBC(1) plus a delta factor, then the method proceeds to step 1111 where $B_{available}$ is set equal to $B_{delta}$. This flowchart branch is used to address situations in which all existing flows are remotely constrained and will remain so even following the addition of a new flow. In such a scenario, the bandwidth available to a new flow is simply the unused capacity of the link, $B_{delta}$.

If the value of $B_{delta}$ is not greater than CBC(1) or CBC(1) plus a delta factor, then the method proceeds to step 1113 where n' is determined. The parameter n' is the CBC index which predicts the boundary between the subset of locally constrained flows and the subset of remotely constrained flows if an additional flow were to be added. Flows having a CBC with an index less than or equal to n' are predicted to be locally constrained with the addition of a new flow. Flows having a CBC with an index greater than n' are predicted to remain remotely constrained even with the addition of a new flow.

The value of n' may be determined by numerous methods and based on the following aspects of flow behavior: (a) flows constrained locally will share the available bandwidth equally, (b) flows constrained remotely may become locally constrained once a new flow is added, and (c) no flows, such as a remotely constrained flow, will consume more bandwidth than that of locally constrained flows.

For example, the value of n' may be determined by finding the largest n' which satisfies the following inequality:

$$\frac{B_{delta} + \sum_{i=1}^{n'} CBC(i)}{n' + 1} < CBC(n')$$

In step 1115, the bandwidth available to a new flow, $B_{available}$ is calculated based on the value of n' determined in the previous step. The value of $B_{available}$ may be computed as follows $$B_{available} = \frac{B_{delta} + \sum_{i=1}^{n'} CBC(i)}{n' + 1}$$

Calculating the Effect on Existing Flows

The methods of FIG. 10 and FIG. 11 for calculating the available bandwidth for a candidate flow may be used to calculate the effect that a new flow may have on existing, active flows. In an embodiment, step 1009 of FIG. 10, using any of equations (1) through (4), may be modified to include the determination of the predicted bandwidth consumption (PBC) for all active flows on a link as follows:

PBC(i)=$B_{available}$ for all active flows i with
    CBC(i)>$B_{available}$     (Equation 5)

PBC(i)=CBC(i) for all active flows i with
    CBC(i)<=$B_{available}$     (Equation 6)

In an alternative embodiment, step 1115 of FIG. 11 may be augmented using Equations 5 and 6 above. In Equations 5 and 6 above, the PBC is calculated for a flow with reference to a single link (a "local" PBC). However, flows may be carried using more than one link. As such, a global PBC may be computed for each flow which is carried across more than one link. In an embodiment, a set of local PBCs may be generated for a flow by using Equations 5 and 6 for each link carrying the flow. The global PBC for that flow is the local PBC having the lowest value.

Steps 1009 of FIG. 10 and 1115 of FIG. 11 may be augmented by computing a global PBC for each active flow, as described above.

Use of Predicted Bandwidth Consumption

In an aspect, the set of PBCs calculated for existing flows may be used to determine the effect a block placement option may have on the SLA/QoS requirements for existing flows (and their respective users). Similarly $B_{available}$ may be used to evaluate whether a particular block placement option meets the SLA/QoS requirements of the user generating a new block request.

In this document, methods describing the management of user SLA/QoS requirements and performance targets or guarantees may be similarly applied to scenarios in which SLA/QoS requirements and performance targets or guarantees are associated with individual jobs. A job may be defined, for example, as a block replication process. It may be possible that a single user initiates multiple jobs, each job having unique SLA/QoS requirements.

For example, the set of PBCs and $B_{available}$ may be calculated and used in step 707 of FIG. 7. In an enhanced step 707, a block placement option may be eliminated from list L when one or more of the PBCs of active flows using one or more network links of a block placement option fall below the minimum SLA/QoS performance target or guarantee. For example, consider a gold-level user with an SLA which guarantees that flows will be carried with at least 500 Mbps of network bandwidth. If a block placement option for a new block request from another user yields a PBC for a flow associated with the gold-level user of 400 Mbps (less than the SLA guarantee of 500 Mbps), then the block placement option may be removed from list L. Similarly, if the gold-level user creates a new block request, and the $B_{available}$ of a block placement option is 350 Mbps (also less than the SLA guarantee of 500 Mbps), then the block placement option is removed from list L.

In an embodiment, $B_{available}$ and the set of PBCs, along with their associated SLA performance targets or guarantees, may be used as inputs to the cost function used in step 709 in FIG. 7 to evaluate each block placement option in the list L. For example, the following network cost function may be used:

$cost_{network} = w_1 \cdot cost_1 + w_2 \cdot cost_2 + w_3 \cdot cost_3$     (Equation 7)

in which:

$$cost_1 = \frac{block\_size(BPR)}{B_{available}};$$

$cost_2$=0, for $B_{available}$>=minimum SLA bandwidth target or guarantee, for the user associated with the new block request, or if no SLA bandwidth target or guarantee exists;
    1, for $B_{available}$<minimum SLA bandwidth target or guarantee, for the user associated with the new block request;

$cost_3$=the number of other users having one or more existing flows along one or more network links of the block placement option where the PBC<minimum SLA bandwidth target or guarantee; and $w_1$, $w_2$, $w_3$ are weights controlling the relative importance of the performance term (cost1), SLA term for the user of the new block request (cost2) and the SLA term for existing users affected by the new block request (cost3), respectively. Weights may be set to zero to eliminate the effect of one or more terms.

One skilled in the art would appreciate that this cost function may also be combined with cost functions having other terms, such as those described with reference to FIG. 6 and FIG. 7.

Alternatively, the term $cost_3$ may be a function of both (1) the number users with a PBC below a corresponding minimum SLA bandwidth target or guarantee and (2) the amount by which the PBC falls below the target or guarantee. For example:

$$cost_3 = \sum_{j=1}^{m} v_j * \left( \frac{SLA(j) - APBC(j)}{SLA(j)} \right)^{u_j}$$

Where:

m is the number of users having one or more existing flows along one or more network links of the block placement option where the PBC<minimum SLA bandwidth target or guarantee;

SLA(j) is the minimum SLA bandwidth target or guarantee (e.g., in Mbps) for the $j^{th}$ user having one or more existing flows along one or more network links of the block placement option where the PBC is less than the minimum SLA bandwidth target or guarantee;

APBC(j) is the aggregate PBC (e.g., in Mbps) for the $j^{th}$ user having one or more existing flows along one or more network links of the block placement option where the sum of PBCs (local or global) for all flows associated with that user on a link is less than the minimum SLA bandwidth target or guarantee. The APBC may be calculated by summing the PBC for all active flows on a link associated with a user. If a user has a flow along more than one network link in which the APBC is less than the minimum SLA bandwidth target or guarantee, then the lowest APBC may be used for that user in the calculation of $cost_3$;

$u_j$ is an optional parameter which, when set to a value greater than 1, may be used to assign increasingly larger costs for larger differences between an APBC and a corresponding SLA performance target or guarantee. This parameter may vary as a function of specific user or user classes; and $v_j$ is an optional parameter which may be used to overweight or underweight the effect of an SLA violation for certain users or user classes. For example, v may be set to 1 for bronze class users, 2 for silver class and 3 for gold class users, an SLA characteristic which may be known in advance via SLA policy/QoS interface 610.

Further SLA Management Techniques

In highly congested network conditions, it is possible that no block placement option (BPO) meets the placement policy and SLA/QoS requirements for the existing or new user, when evaluated in step 707 of FIG. 7. Similarly, it may be possible that no placement options exist with a cost below a maximum threshold when evaluated in step 711 of FIG. 7. A number of alternative approaches may be used to address these scenarios.

Reduced Location Policy Constraints

In a first approach, a second iteration of step 707 generating a $2^{nd}$ list L may be performed but with fewer location policy constraints. For example, step 707 may be repeated without requiring the placement options to meet some or all of the block placement location policy. The default Hadoop block placement location policy has two constraints (a) to place at least two of the replicas in different racks; and (b) to place at least two of the replicas in a single rack. In generating a $2^{nd}$ list L, constraint (a) or (b) or both may be eliminated.

SLA Degradation

In a second approach, the generation of a $2^{nd}$ list L may be performed with the SLA/QoS requirements of one or more users or classes of users reduced or eliminated. For example, in a first iteration of step 707, $B_{available}$ (for the new block placement request) and the set of all PBCs for active flows associated with other users having an SLA may be evaluated against a corresponding target or guaranteed bandwidth to generate list L, as previously described. If a first list L is empty, a $2^{nd}$ list L may be generated only considering PBCs for flows associated with users having an SLA with a guaranteed (but not target) bandwidth.

Alternatively, a $2^{nd}$ list L may be generated by reducing or eliminating the SLA/QoS requirement of the user making the new block placement request. If a suitable BPO is found using this second list, an optional message may be sent to the Client 510 (possibly by way of File Manager Node 520) requesting permission to suspend the SLA requirement for this replication.

A $2^{nd}$ list L may be generated only considering those PBCs for flows associated with users having an SLA with an equal or higher class of service than the user associated with the new block request. For example, consider a scenario having three SLA classes, listed in increasing importance and priority: bronze, silver, and gold. If a new block request is being processed for a user with a silver SLA, then a $2^{nd}$ list L may be generated only considering the effect that the new flow will have on existing flows of users with silver and gold SLAs. Flows associated with users having a bronze SLA will not be considered. If a suitable BPO is found using the $2^{nd}$ list L for the silver user, one or more flows associated with users having a bronze SLA may no longer meet their SLA performance targets or guarantees.

This method may be extended to operation beyond two iterations. By doing so, many PBC sets, each having fine-grained differences between them, may be evaluated. This approach may be used to precisely determine the impact that a new flow may have on existing flows and their users. Using the above example of a silver user making a new block request, a PBC set may be created suspending the bandwidth guarantee of a single bronze user to generate a $2^{nd}$ list L. If a suitable BPO is not found for the silver user, a PBC set suspending the guarantees for two bronze users may be used to generate a $3^{rd}$ list L. This process may continue until a suitable BPO is found for the silver user, or it is determined that no suitable BPO may be found without an unacceptable effect on the performance of existing users (e.g., suspension of the flows associated with a gold user).

Reduced Cost Function Constraints

In a third approach, the above methods may be applied in a similar fashion for situations where no BPOs exist having a cost function value below a maximum threshold, as evaluated in step 711. In such a situation, the cost function may be adjusted to reduce the quantity or importance of certain cost function criteria (e.g., terms in the cost function equations previously discussed). For example, consider a scenario in which the $cost_{network}$ function included a term quantifying energy usage, as described above with reference to FIG. 7. If no BPO exists with a cost below a maximum threshold, then the cost for each BPO may be recalculated after setting the weighting factor of the energy usage term (e.g., weight$_{network,power}$) to zero.

Methods for Iteration

One skilled in the art would appreciate that the above iterative methods may be implemented in various ways. In an embodiment, step 707 is repeated completely, with the list L being filtered based on a different set of criteria (e.g., different sets of PBCs) for each iteration. Alternatively, step 707 may be performed once, with the SLA/QoS evaluation performed for more than one set of PBCs in parallel. Similarly step 709 may be simply repeated using different cost functions until a cost function results in a least one suitable BPO. Alternatively, step 709 may be executed one time, using a set of cost functions determined in advance. In this latter case, step 711 may be modified as follows:

- Select the BPO with the lowest cost below a maximum threshold, based on use of the cost function having the most desired set of evaluation criteria.
- If no BPO exists, then select a BPO with the lowest cost below a maximum threshold, based on use of the cost function having the second most desired set of evaluation criteria, and so on.

Replication Delay

In a fourth approach, the replication process may be delayed if no suitable BPO is found. In an embodiment, the delay may be for a specified period of time, for example, 5 seconds, after which steps 703 through 707, or possibly steps 703 through 711, may be repeated. This operation may continue indefinitely, or may terminate after a fixed number of attempts. A message may be sent to the user, for example, Client 427 and file manager node 428 indicating that a replication is delayed or terminated.

Limited Reduction of Replication Factor

In a fifth approach, the replication factor of a new block request is reduced and a new list L is created. As above, this approach may involve multiple iterations, for example, to determine if a suitable block placement option exists first for a replication factor of 3, then 2 and then 1. One skilled in the art would appreciate that this iterative method may be implemented in various ways, including full iteration of step 707. Alternatively, the method to develop an initial set of BPOs (e.g., list $L_A$) may be modified to generate a superset of BPOs for replication factors from 1 to the desired replication factor (e.g., 3). All subsequent steps to filter BPOs not meeting the requirements may process all replication factor options in parallel by operating on the BPO superset.

If the replication factor of a new block request is reduced, a message may be sent from the enhanced DFS block placement module 600 to file manager node 520 and Client 510 indicating the difference between requested and actual behavior.

If the replication factor of a new block request is reduced, a supplemental request may be created in the file manager node 520. The supplemental request may consist of the previous file block which was not successfully replicated the desired number of times, along with the replication factor needed to reach the original, desired replication quantity ("delta replication factor"). The supplemental request may be sent periodically by the file manager node 520 to the enhanced DFS block placement module 600 which responds with a recommended block placement, if one exists. Alternatively, the supplemental request may be made one time, stored by the enhanced DFS block placement module 600 and periodically evaluated (e.g., every 5 seconds) via, for example, steps 703 through 707 until a suitable BPO is determined, a maximum number of attempts is made, or the file block is no longer used or needed.

Global Reduction of Replication Factor

The enhanced DFS block placement module 600 may enforce a replication factor limit based on knowledge of severe congestion or performance degradation in the network. For example, based on network status 670, the enhanced DFS block placement module 600 may calculate the average_network_utilization by dividing the sum of the CBCs across all network links by the sum of the link capacity across all network links. If the average_network_utilization exceeds a maximum threshold (e.g., 70%), then the enhanced DFS block placement module 600 may enforce a maximum replication factor of 2.

This information may be communicated immediately upon determination to the file manager node 520, or may be communicated to the file manager node 520 at the time of a block placement request. This information may be communicated to each client 510 by either file manager node 520 or enhanced DFS block placement module 600. Each client 510 may choose to suspend future file writes or block creation requests of existing file writes, until the restriction is removed, or client 510 may continue to request file writes and block creation requests knowing that the replication factor will be reduced.

Multiple thresholds may be used to further improve operation. For example, a $2^{nd}$ average network utilization threshold of 85% may be established. When the average network utilization exceeds this $2^{nd}$ threshold, the maximum replication factor may be further reduced to 1.

If the replication factor of a block placement request is reduced, a supplemental request may be created by the file manager node 520. Supplemental requests may be used, as previously described, to create additional file block replications, once network conditions allow, so that the original number of desired replications are ultimately created.

A replication factor limit may be globally applied to all users and block creation requests. Alternatively, different replication factor limits may be applied to specific users or classes of users. For example, under certain network conditions, requests from bronze level users may be subjected to a more restrictive limit (e.g., replication factor of 1), whereas requests from silver level users may be subjected to a less restrictive limit (e.g., replication factor of 2), and requests from a gold level user subjected to no restriction.

Replication Pre-Emption

In a sixth approach, one or more existing block replication processes (or pipelines) may be suspended, and optionally resumed at a later time, in order to create bandwidth for a new block creation request with higher importance or priority. For example, two block replication processes for two users each with a Bronze SLA may be suspended in order to free enough capacity to determine a suitable BPO meeting the SLA requirements for a Gold user. In an aspect, one or more file replication processes, each consisting of multiple file block replication processes, may be terminated or delayed.

The effect of suspending an existing block replication process on a candidate flow may be predicted via calculation of $B_{available}$ as described above with the following modifications:

- The value of n may be reduced by the number of flows to be eliminated.
- The value of a may be adjusted by the number of flows to be eliminated having remote constraints.

An iterative approach may be used to determine the minimum number of block replication processes that need to be suspended in order to support a new block request. The iterative approach may begin first with suspension candidates having the lowest importance or priority (e.g., processes associated with users having no SLA) and continue to add suspension candidates with increasing importance or priority.

A block replication process or pipeline may be suspended using various methods. A message may be sent from the enhanced DFS block placement module 600 to the client 510 (optionally relayed through file manager node 520) requesting the immediate cessation of all new packet transmissions associated with the current block replication process. A message may be sent to all but the last storage node used for the block replication pipeline requesting the immediate cessation of all packet forwarding associated with each suspended block replication process. Each of the storage nodes 50*x* and/or client 510 may send an acknowledgment back to the enhanced DFS block placement module 600 and file manager node 520 indicating compliance with the request. In an aspect, once a suspend message is received, client 510 may suspend all subsequent block creation requests for the file associated with the suspended process. Alternatively, file manager node 520 may reject all block creation requests for subsequent file blocks associated with the suspended process.

In an embodiment, each suspended block replication process may become a candidate to resume replication. A delta block request may be created in file manager node 520 for each suspended process. The delta block request may consist of the file block which was not successfully replicated (or the subset of packets not successfully replicated), along with the list of storage nodes having a partial file block. The delta block request may be made periodically by the file manager to the enhanced DFS block placement module 600. The enhanced DFS block placement module 600 may respond with a resume OK message when replication may be restarted or resumed. The resume OK message may also include information confirming that replication may resume using (a) the previous BPO, (b) the previous set of storage nodes but using a different replication order and/or network path, or (c) that block replication should be restarted using a different BPO consisting of at least one new storage node. In the latter case, then file manager node 520 may request deletion of the partial file blocks previously stored. Alternatively, the delta block request may be made one time, stored by the enhanced DFS block placement module 600 and periodically evaluated (e.g., every 5 seconds) via steps 703 through 707 until a suitable BPO is determined or possibly a maximum number of attempts is made. Following the receipt of the resume OK message, the file manager node 520 may initiate the pipeline writes needed to complete the block replication process, or the file manager node may request that client 510 initiate the pipeline write.

In an embodiment, following the suspension of a block replication process, file manager node 520 may request the deletion of each partial file block stored in one or more storage nodes. Once completed, a resume OK message may be sent to each Client 510 having one or more suspended block replication process. Once Client 510 receives the resume OK message, it may begin sending new block creation requests for the file blocks previously suspended. Such new block creation requests may not be granted if network conditions have not improved, however use of previously described techniques may be used to ensure that such a condition is handled properly.

Once a resume OK message is received by client 510, the suspension of all subsequent block creation requests for the file associated with the suspended process may be removed.

One skilled in the art would appreciate that in each SLA management technique described above, there may exist certain network conditions in which no suitable BPO may be found. In such a case, and for any of the techniques, a maximum number (or duration) of attempts may be made after which operation using a technique will terminate. In such a case, a message may be sent to both file manager node 520 and possibly client 510 indicating a failure of the technique to determine a suitable BPO.

One skilled in the art would appreciate how the above SLA management techniques may be used in various combinations, each potentially being employed under different circumstances or potentially being performed one followed by another. For example, the technique of replication delay may be attempted first, and if unsuccessful (e.g., a maximum number of attempts made), a limited reduction of replication factor may be attempted next. If that technique fails to successfully identify a suitable BPO, then replication preemption may then be attempted.

It should be appreciated that the above techniques related to FIGS. 10 and 11, as described in the related text above, can be utilized to predict the performance of TCP flows in other network environments, such as wireless and wired communication network environments, and are not necessarily limited to the block placement applications as set forth herein.

The foregoing systems and methods and associated devices and modules are susceptible to many variations. Additionally, for clarity and concision, many descriptions of the systems and methods have been simplified. For example, the figures generally illustrate one of each type of network device, but a network system may have many of each type of device.

As described in this specification, various systems and methods are described as working to optimize particular parameters, functions, or operations. This use of the term optimize does not necessarily mean optimize in an abstract theoretical or global sense. Rather, the systems and methods may work to improve performance using algorithms that are expected to improve performance in at least many common cases. For example, the systems and methods may work to optimize performance judged by particular functions or criteria. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for a file block placement by predicting available bandwidth for a candidate flow on a link in a distributed network, the method comprising:
obtaining information about a plurality of flows carried by the link, the information about the plurality of flows carried by the link including a current bandwidth consumption for each flow of the plurality of flows carried by the link;
identifying whether each flow of the plurality of flows has a local constraint or a remote constraint, wherein the local constraint is a throughput constraint of the each flow of the link and the remote constraint is a throughput constraint of each flow of another physical link other than the link; and
computing the available bandwidth for the candidate flow based at least in part on the information about the plurality of flows carried by the link and the identification of whether each flow of the plurality of flows has a local constraint or a remote constraint to generate a predicted available bandwidth for the candidate flow;
selecting one of a plurality of file block placement options based at least in part on the predicted available bandwidth which meets a particular quality of service (QoS) requirement;
determining a set of storage nodes which correspond to the one of the plurality of file block placement options as selected; and
performing the file block placement to the set of storage nodes, wherein computing the available bandwidth for the candidate flow comprises:
subtracting a sum of the current bandwidth consumption of the flows carried by the link having a remote constraint from a capacity of the link; and
dividing the difference by the number of flows carried by the link plus one minus the number of flows carried by the link having a remote constraint.

2. The method of claim 1, wherein identifying whether each flow of the plurality of flows has a local constraint or a remote constraint comprises:
comparing the current bandwidth consumption for each flow of the plurality of flows carried by the link to a maximum current bandwidth consumption of the plurality of flows carried by the link; and
identifying, in the case that the current bandwidth consumption for a flow of the plurality of flows carried by the link is approximately equal to the maximum current bandwidth consumption of the plurality of flows carried by the link, that flow as having a local constraint.

3. The method of claim 1, further comprising determining a subset of active flows of the plurality of flows by comparing the current bandwidth consumption of each flow of the plurality of flows to a threshold.

4. The method of claim 1, wherein identifying whether each flow of the plurality of flows has a local constraint or a remote constraint comprises:
determining an unused capacity of the link;
sorting the flows carried by the link having based on the associated current bandwidth consumption; and
identifying a set of the sorted flows having the largest associated current bandwidth consumption as having a local constraint.

5. The method of claim 4, wherein computing the available bandwidth for the candidate flow comprises:
summing the unused capacity of the link and a total of the current bandwidth consumptions of the flows identified as having a local constraint; and
dividing the sum of the number of flows identified as having a local constraint plus one.

6. The method of claim 1, further comprising determining a subset of active flows of the plurality of flows and predicting a bandwidth consumption for at least some of the active flows.

7. The method of claim 6, wherein predicting the bandwidth consumption comprises:
predicting, for an active flow having a current bandwidth consumption less than the computed available bandwidth, the bandwidth consumption to be the current bandwidth consumption associated with that flow; and predicting, for an active flow having a current bandwidth consumption greater than the computed available bandwidth, the bandwidth consumption to be the computed available bandwidth.

8. The method of claim 6, further comprising:
generating a plurality of file block placement options for a file block, each file block placement option being associated with at least one of a plurality of data storage nodes in the distributed network, the file block placement options being based on a set of network parameters associated with the distributed network; and
selecting one of the plurality of file block placement options based at least in part on the predicted bandwidth consumptions.

9. The method of claim 8, further comprising determining whether each of the plurality of file block placement options satisfies requirements associated with users of the distributed network.

10. The method of claim 9, wherein the set of network parameters includes one or more constraints, and wherein the method further comprises, when none of the plurality of file block placement options satisfies the requirements associated with the users of the distributed network:
relaxing at least one of the constraints;
generating a second plurality of file block placement options for the file block using the relaxed at least one constraint;
predicting a bandwidth consumption for each active flow for a candidate file block placement option of the second plurality of file block placement options; and
selecting one of the second plurality of file block placement options based at least in part on the predicted bandwidth consumptions associated with the candidate file block placement option of the second plurality of file block placement options.

11. The method of claim 9, further comprising, when none of the plurality of file block placement options satisfies the requirements associated with the users of the distributed network:
reducing the requirements associated with users of the distributed network by excluding at least one of the requirements associated with at least one of the users of the distributed network; and
determining whether each of the plurality of file block placement options satisfies the reduced requirements.

12. The method of claim 9, further comprising, when none of the plurality of file block placement options satisfies the requirements associated with the users of the distributed network, delaying selecting one of the plurality of file block placement options.

13. The method of claim 9, further comprising, when none of the plurality of file block placement options satisfies the requirements associated with the users of the distributed network:
predicting a bandwidth consumption for at least some of the active flows for a candidate file block placement option of the plurality of file block placement options taking into account suspension of one or more existing block replication processes;
selecting one of the plurality of file block placement options based at least in part on the predicted bandwidth consumptions taking into account the suspension of one or more existing block replication processes; and
suspending the one or more existing block replication processes.

14. A computing device for predicting available bandwidth for a file block placement of a candidate flow on a link in a distributed network, the computing device comprising:

a memory configured to store data and processing instructions; and
a processor configured to retrieve and execute the processing instructions stored in the memory to cause the processor to perform the steps of:
obtaining information about a plurality of flows carried by the link, the information about the plurality of flows carried by the link including a current bandwidth consumption for each flow of the plurality of flows carried by the link;
identifying whether each flow of the plurality of flows has a local constraint or a remote constraint, wherein the local constraint is a throughput constraint of the each flow of the link and the remote constraint is a throughput constraint of each flow of another physical link other than the link; and
computing the available bandwidth for the candidate flow based at least in part on the information about a plurality of flows carried by the link and the identification of whether each flow of the plurality of flows has a local constraint or a remote constraint to generate a predicted available bandwidth for the candidate flow;
selecting one of a plurality of file block placement options based at least in part on the predicted available bandwidth which meets a particular quality of service (QoS) requirement;
determining a set of storage nodes which correspond to the one of the plurality of file block placement options as selected; and
performing the file block placement to the set of storage nodes, wherein computing the available bandwidth for the candidate flow comprises:
subtracting a sum of the current bandwidth consumption of the flows carried by the link having a remote constraint from a capacity of the link; and
dividing the difference by the number of flows carried by the link plus one minus the number of flows carried by the link having a remote constraint.

15. The computing device of claim 14, wherein identifying whether each flow of the plurality of flows has a local constraint or a remote constraint comprises:
comparing the current bandwidth consumption for each flow of the plurality of flows carried by the link to a maximum current bandwidth consumption of the plurality of flows carried by the link; and
identifying, in the case that the current bandwidth consumption for a flow of the plurality of flows carried by the link is approximately equal to the maximum current bandwidth consumption of the plurality of flows carried by the link, that flow as having a local constraint.

16. The computing device of claim 14, wherein the processing instructions further cause the processor to perform the step of determining a subset of active flows of the plurality of flows by comparing the current bandwidth consumption of each flow of the plurality of flows to a threshold.

17. The computing device of claim 14, wherein identifying whether each flow of the plurality of flows has a local constraint or a remote constraint comprises:
determining an unused capacity of the link;
sorting the flows carried by the link having based on the associated current bandwidth consumption; and
identifying a set of the sorted flows having the largest associated current bandwidth consumption as having a local constraint.

18. The computing device of claim 17, wherein computing the available bandwidth for the candidate flow comprises:
summing the unused capacity of the link and a total of the current bandwidth consumptions of the flows identified as having a local constraint; and
dividing the sum of the number of flows identified as having a local constraint plus one.

19. The computing device of claim 14, wherein the processing instructions further cause the processor to perform the steps of determining a subset of active flows of the plurality of flows and predicting a bandwidth consumption for at least some of the active flows.

20. The computing device of claim 19, wherein predicting the bandwidth consumption comprises:
predicting, for an active flow having a current bandwidth consumption less than the computed available bandwidth, the bandwidth consumption to be the current bandwidth consumption associated with that flow; and
predicting, for an active flow having a current bandwidth consumption greater than the computed available bandwidth, the bandwidth consumption to be the computed available bandwidth.

21. The computing device of claim 20, wherein the processing instructions further cause the processor to perform the steps of:
generating a plurality of file block placement options for a file block, each file block placement option being associated with at least one of a plurality of data storage nodes in the distributed network, the file block placement options being based on a set of network parameters associated with the distributed network; and
selecting one of the plurality of file block placement options based at least in part on the predicted bandwidth consumptions.

22. The computing device of claim 21, wherein the processing instructions further cause the processor to perform the step of determining whether each of the plurality of file block placement options satisfies requirements associated with users of the distributed network.

23. The computing device of claim 22, wherein the set of network parameters includes one or more constraints, and wherein the processing instructions further cause the processor to perform the step of, when none of the plurality of file block placement options satisfies the requirements associated with the users of the distributed network:
relaxing at least one of the constraints;
generating a second plurality of file block placement options for the file block using the relaxed at least one constraint;
predicting a bandwidth consumption for each active flow for a candidate file block placement option of the second plurality of file block placement options; and
selecting one of the second plurality of file block placement options based at least in part on the predicted bandwidth consumptions associated with the candidate file block placement option of the second plurality of file block placement options.

24. The computing device of claim 22, wherein the processing instructions further cause the processor to perform the step of, when none of the plurality of file block placement options satisfies the requirements associated with the users of the distributed network:
reducing the requirements associated with users of the distributed network by excluding at least one of the requirements associated with at least one of the users of the distributed network; and
determining whether each of the plurality of file block placement options satisfies the reduced requirements.

25. The computing device of claim 22, wherein the processing instructions further cause the processor to perform the step of, when none of the plurality of file block placement options satisfies the requirements associated with the users of the distributed network, delaying selecting one of the plurality of file block placement options.

26. The computing device of claim 22, wherein the processing instructions further cause the processor to perform the step of, when none of the plurality of file block placement options satisfies the requirements associated with the users of the distributed network:
predicting a bandwidth consumption for at least some of the active flows for a candidate file block placement option of the plurality of file block placement options taking into account suspension of one or more existing block replication processes;
selecting one of the plurality of file block placement options based at least in part on the predicted bandwidth consumptions taking into account the suspension of one or more existing block replication processes; and
suspending the one or more existing block replication processes.

27. A non-transitory computer-readable medium storing computer-executable instructions that, when executed by a processor, perform a method for predicting available bandwidth for a file block placement of a candidate flow on a link in a distributed network, the method comprising:
obtaining information about a plurality of flows carried by the link, the information about the plurality of flows carried by the link including a current bandwidth consumption for each flow of the plurality of flows carried by the link;
identifying whether each flow of the plurality of flows has a local constraint or a remote constraint, wherein the local constraint is a throughput constraint of the each flow of the link and the remote constraint is a throughput constraint of each flow of another physical link other than the link; and
computing the available bandwidth for the candidate flow based at least in part on the information about a plurality of flows carried by the link and the identification of whether each flow of the plurality of flows has a local constraint or a remote constraint to generate a predicted available bandwidth for the candidate flow;
selecting one of a plurality of file block placement options based at least in part on the predicted available bandwidth which meets a particular quality of service (QoS) requirement;
determining a set of storage nodes which correspond to the one of the plurality of file block placement options as selected; and
performing the file block placement to the set of storage nodes, wherein computing the available bandwidth for the candidate flow comprises:
subtracting a sum of the current bandwidth consumption of the flows carried by the link having a remote constraint from a capacity of the link; and
dividing the difference by the number of flows carried by the link plus one minus the number of flows carried by the link having a remote constraint.

* * * * *